US012462782B2

United States Patent
Ferguson et al.

(10) Patent No.: US 12,462,782 B2
(45) Date of Patent: Nov. 4, 2025

(54) SYSTEM FOR DYNAMICALLY ADJUSTING A SOUNDMASK SIGNAL BASED ON REALTIME AMBIENT NOISE PARAMETERS WHILE MAINTAINING ECHO CANCELLER CALIBRATION PERFORMANCE

(71) Applicant: NUREVA, INC., Calgary (CA)

(72) Inventors: Richard Dale Ferguson, Okotoks (CA); Linshan Li, Calgary (CA)

(73) Assignee: NUREVA, INC., Calgary (CA)

( * ) Notice: Subject to any disclaimer, the term of this patent is extended or adjusted under 35 U.S.C. 154(b) by 667 days.

(21) Appl. No.: 17/846,465

(22) Filed: Jun. 22, 2022

(65) Prior Publication Data

US 2022/0415299 A1 Dec. 29, 2022

Related U.S. Application Data

(60) Provisional application No. 63/214,871, filed on Jun. 25, 2021.

(51) Int. Cl.
| | |
|---|---|
| G10K 11/175 | (2006.01) |
| G10L 21/0208 | (2013.01) |
| H04M 9/08 | (2006.01) |

(52) U.S. Cl.
CPC ...... *G10K 11/1754* (2020.05); *G10L 21/0208* (2013.01); *H04M 9/082* (2013.01); *G10L 2021/02082* (2013.01)

(58) Field of Classification Search
CPC ............ G10K 11/1754; G10K 11/1752; G10L 21/0208; G10L 2021/02082; H04M 9/082
See application file for complete search history.

(56) References Cited

U.S. PATENT DOCUMENTS

| | | | | |
|---|---|---|---|---|
| 3,567,863 | A | * | 3/1971 | Morrissey ............ G10K 11/175 380/252 |
| 4,998,241 | A | | 3/1991 | Brox et al. |

(Continued)

FOREIGN PATENT DOCUMENTS

| | | |
|---|---|---|
| EP | 3839941 A1 | 6/2021 |
| WO | 0074362 A2 | 12/2000 |

OTHER PUBLICATIONS

Notice of Allowance dated Aug. 19, 2020, from U.S. Appl. No. 16/407,636, 31 sheets.

(Continued)

*Primary Examiner* — Lisa Hashem
(74) *Attorney, Agent, or Firm* — KATTEN MUCHIN ROSENMAN LLP

(57) ABSTRACT

A system and method are provided for dynamic sound mask adjustment. A sound mask is used for obtaining an impulse response measurement that adjusts a generated sound mask dynamically based on real-time ambient noise parameters, while maintaining echo canceller calibration performance. The system includes a dynamic sound mask generator that includes a noise accumulator and monitor that includes a processor and memory including instructions executed by the processor for performing the dynamic sound mask adjustment. If the sound mask is not in the hysteresis range, the current sound mask level and iteration update rate are adjusted. if the sound mask is in the hysteresis range, the current sound mask level and iteration update rate are maintained.

27 Claims, 27 Drawing Sheets

(56) References Cited

U.S. PATENT DOCUMENTS

| | | | |
|---|---|---|---|
| 6,175,602 | B1 | 1/2001 | Gustafsson et al. |
| 6,459,914 | B1 | 10/2002 | Gustafsson et al. |
| 6,487,257 | B1 | 11/2002 | Gustafsson et al. |
| 6,507,623 | B1 | 1/2003 | Gustafsson et al. |
| 6,542,611 | B1 | 4/2003 | Lane et al. |
| 6,717,991 | B1 | 4/2004 | Gustafsson et al. |
| 6,859,531 | B1 | 2/2005 | Deisher |
| 6,925,176 | B2 | 8/2005 | Myllylae et al. |
| 7,813,499 | B2 | 10/2010 | Chhetri et al. |
| 8,223,985 | B2 * | 7/2012 | Loud .............. H04K 3/42 381/71.4 |
| 8,275,120 | B2 | 9/2012 | Stokes, III et al. |
| 8,385,557 | B2 | 2/2013 | Tashev et al. |
| 8,693,678 | B2 | 4/2014 | Lindstroem et al. |
| 8,892,431 | B2 | 11/2014 | Gerkmann et al. |
| 8,903,722 | B2 | 12/2014 | Jeub et al. |
| 8,972,251 | B2 * | 3/2015 | Xiang ............... H04K 3/825 704/226 |
| 9,172,816 | B2 | 10/2015 | Ahgren |
| 9,277,059 | B2 | 3/2016 | Ahgren |
| 9,437,179 | B2 * | 9/2016 | Mikami ............... H04R 3/02 |
| 9,473,646 | B1 | 10/2016 | Chhetri |
| 9,503,815 | B2 * | 11/2016 | Ramprashad ......... H04M 19/08 |
| 9,818,425 | B1 | 11/2017 | Ayrapetian et al. |
| 10,074,353 | B2 * | 9/2018 | Cook ............... H04R 27/00 |
| 10,499,151 | B2 | 12/2019 | McGibney |
| 10,895,612 | B2 * | 1/2021 | Vasudev ............. G01R 33/14 |
| 11,736,876 | B2 * | 8/2023 | LaBosco ............ G10L 21/0208 381/59 |
| 12,160,713 | B2 * | 12/2024 | LaBosco ............... H04R 3/02 |
| 2004/0264686 | A1 | 12/2004 | Enzner |
| 2005/0063536 | A1 | 3/2005 | Myllyla et al. |
| 2012/0053931 | A1 * | 3/2012 | Holzrichter ......... H04R 3/002 704/E19.001 |
| 2012/0283593 | A1 * | 11/2012 | Searchfield .......... H04R 25/75 381/17 |
| 2012/0316869 | A1 | 12/2012 | Xiang et al. |
| 2013/0030803 | A1 * | 1/2013 | Liao ................ H04R 3/005 704/E15.001 |
| 2013/0230184 | A1 | 9/2013 | Kuech et al. |
| 2014/0363008 | A1 | 12/2014 | Chen et al. |
| 2015/0256930 | A1 | 9/2015 | Yamakawa |
| 2024/0112661 | A1 * | 4/2024 | Blewett ............... H04R 1/406 |

OTHER PUBLICATIONS

Supplemental Notice of Allowance dated Jan. 5, 2022, from U.S. Appl. No. 17/130,951, 17 sheets.
Notice of Allowance dated Dec. 15, 2021, from U.S. Appl. No. 17/130,951, 16 sheets.
Non-Final Rejection dated Sep. 24, 2021, from rom U.S. Appl. No. 17/130,951, 26 sheets.
The extended European search report dated Sep. 13, 2023, from European Patent Application No. 23182185.1, 7 sheets.
International Search Report and Written Opinion mailed Jul. 26, 2019, from International Application No. PCT/CA2019/050621, 8 sheets.
K. Lebart et al., "A New Method Based on Spectral Subtraction for Speech Dereverberation", acta Acustica , vol. 87 , pp. 359-366, 2001.
Christian Schuldt et al., "A Combined Implementation of Echo Suppression, Noise Reduction and Comfort Noise in a Speaker Phone Application", Digest of Technical Papers International Conference on Consumer Electronics, 2007, 3 sheets.
Amit S. Chhetri et al., "Regression-based Residual Acoustic Echo Suppression", International Workshop on Acoustic Echo and Nose Control, Eindhoven, The Netherlands, Sep. 12-15, 2005, 4 sheets.
Rainer Martin, Gerald Werner Enzner, Peter Vary and R\ufcdiger Hoffmann, "The Tight Relation Between Acoustic Echo Cancelation and Residual Echo Suppression by Postfiltering", Institute of Communication Systems and Data Processing IND, Aachen University of Technology, D-52056 Aachen, Institute of Communications Technology Technical University of Braanschweig, Schleinitzstrasse 22, D-38106 Braanschweig, Ruhr University Bochum 2002, 8 sheets.
Rainer Martin, "Spectral Subtraction Based on Minimum Statistics", Institute for Communication Systems and Data Processing (IND), Aachen University of Technology, Temlergraben 55, 52056 Aachen, Germany, Proc. Euro. Signal Processing Conf. (EUSIPCO), 1994, pp. 1182-1185.
Jason Wung, "A system Approach to Multi-Channel Acoustic Echo Cancellation and Residual Echo Suppression for Robust Hands-free Teleconferencing", Georgia Institute of Technology, May 2015, 167 sheets.
Ivan Jelev Tashev, "Sound Capture and Processing: Practical Approaches", Microsoft Research, USA. First published 2009, pp. 21-22, pp. 139-141, pp. 213-215, pp. 218-223, pp. 309-311.
International Search Report and Written Opinion mailed Sep. 13, 2022, from PCT/CA2022/051005, 8 sheets.
Supplementary European Search Report dated Nov. 29, 2021, from EP Application No. 19799422.1, 8 sheets.
The extended European search report dated Apr. 2, 2025, from European Patent Application No. 22826927.0, 8 sheets.

\* cited by examiner

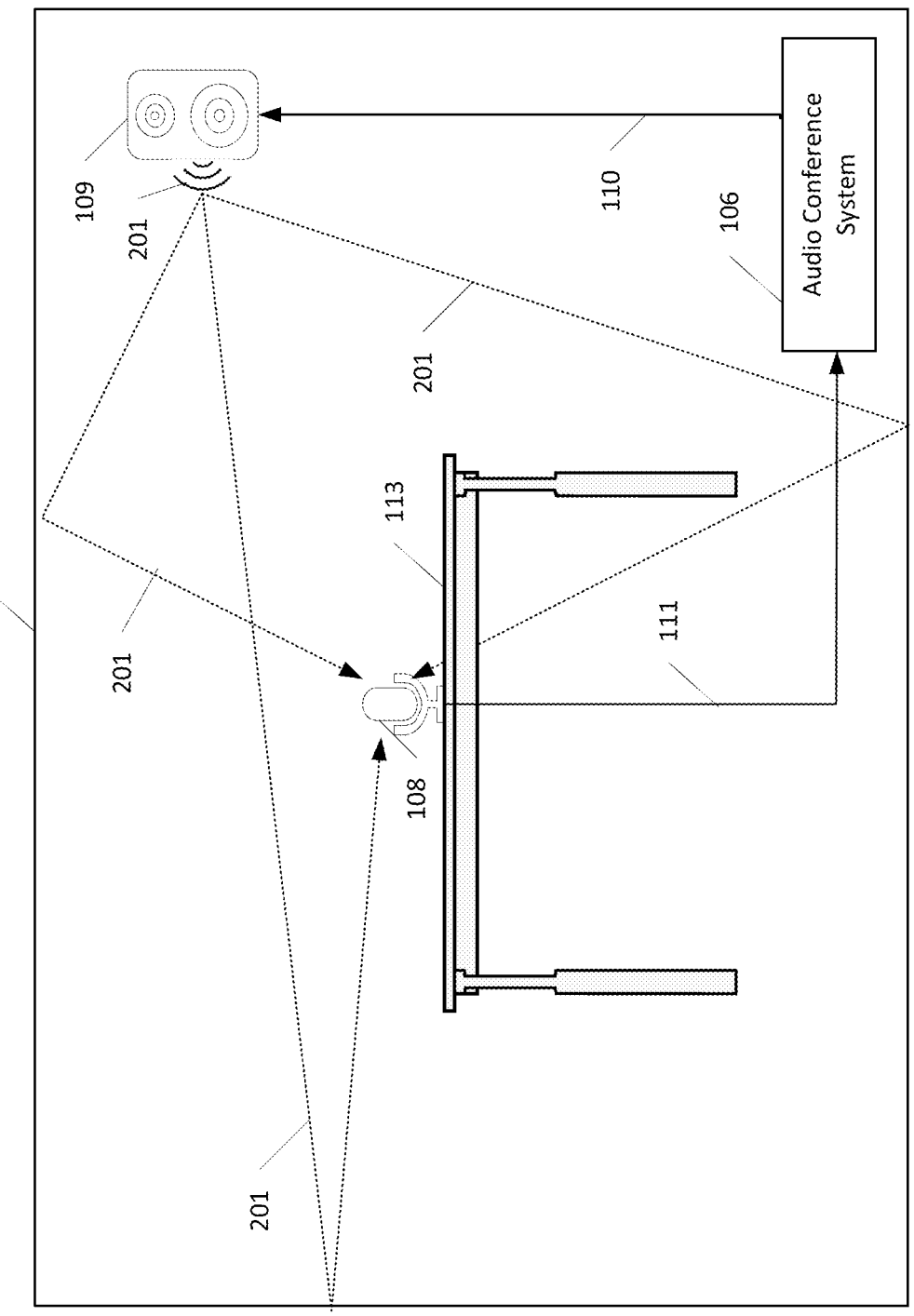
FIG. 2a Room Transfer Function Distributed Microphone System

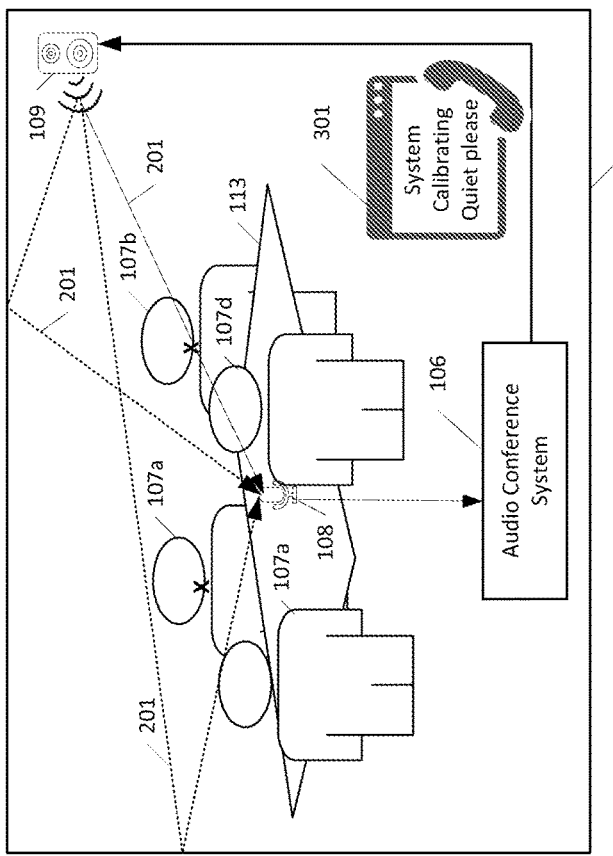
FIG. 3b Prior Art - Manual Calibration
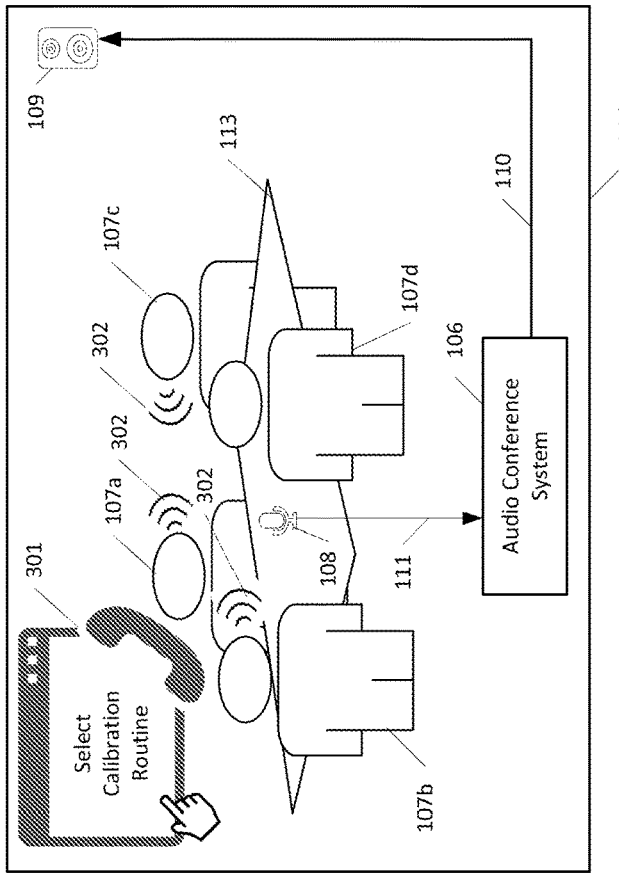
FIG. 3a Prior Art - Manual Calibration

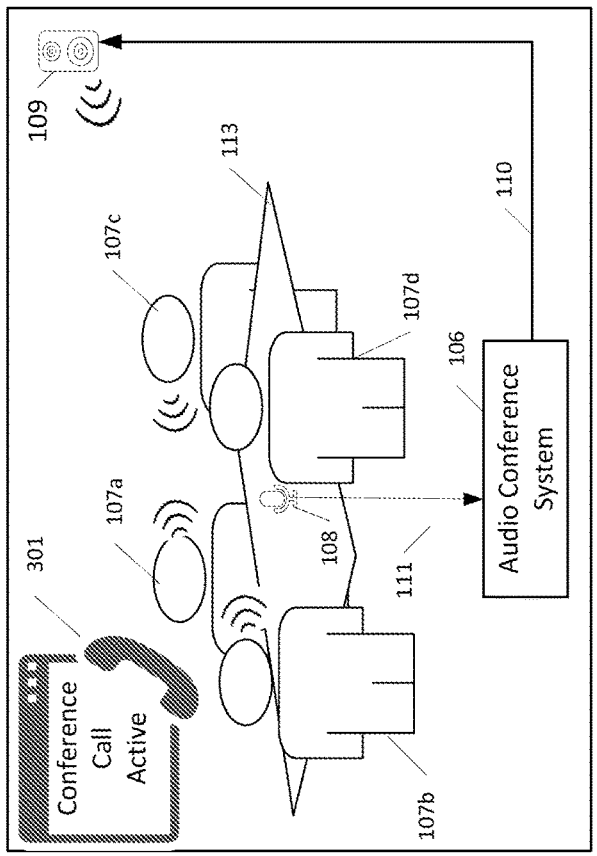
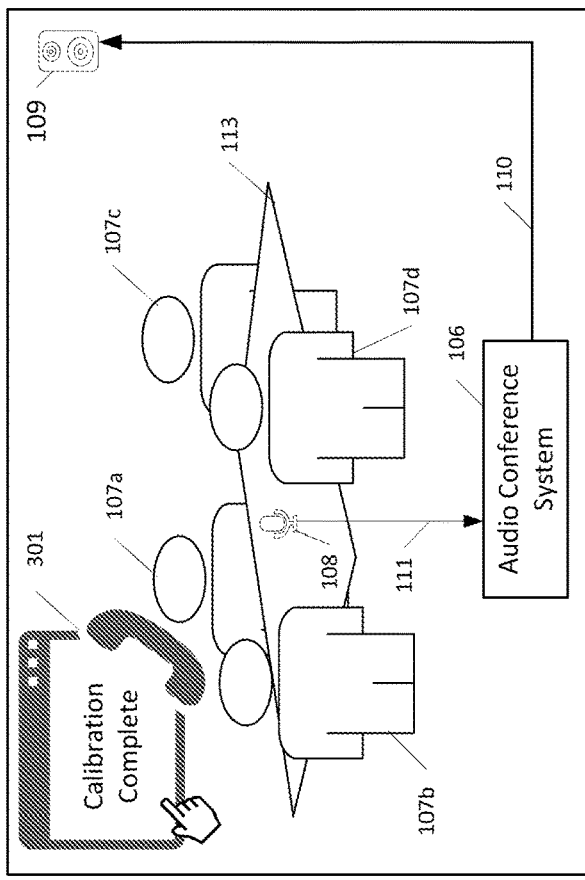

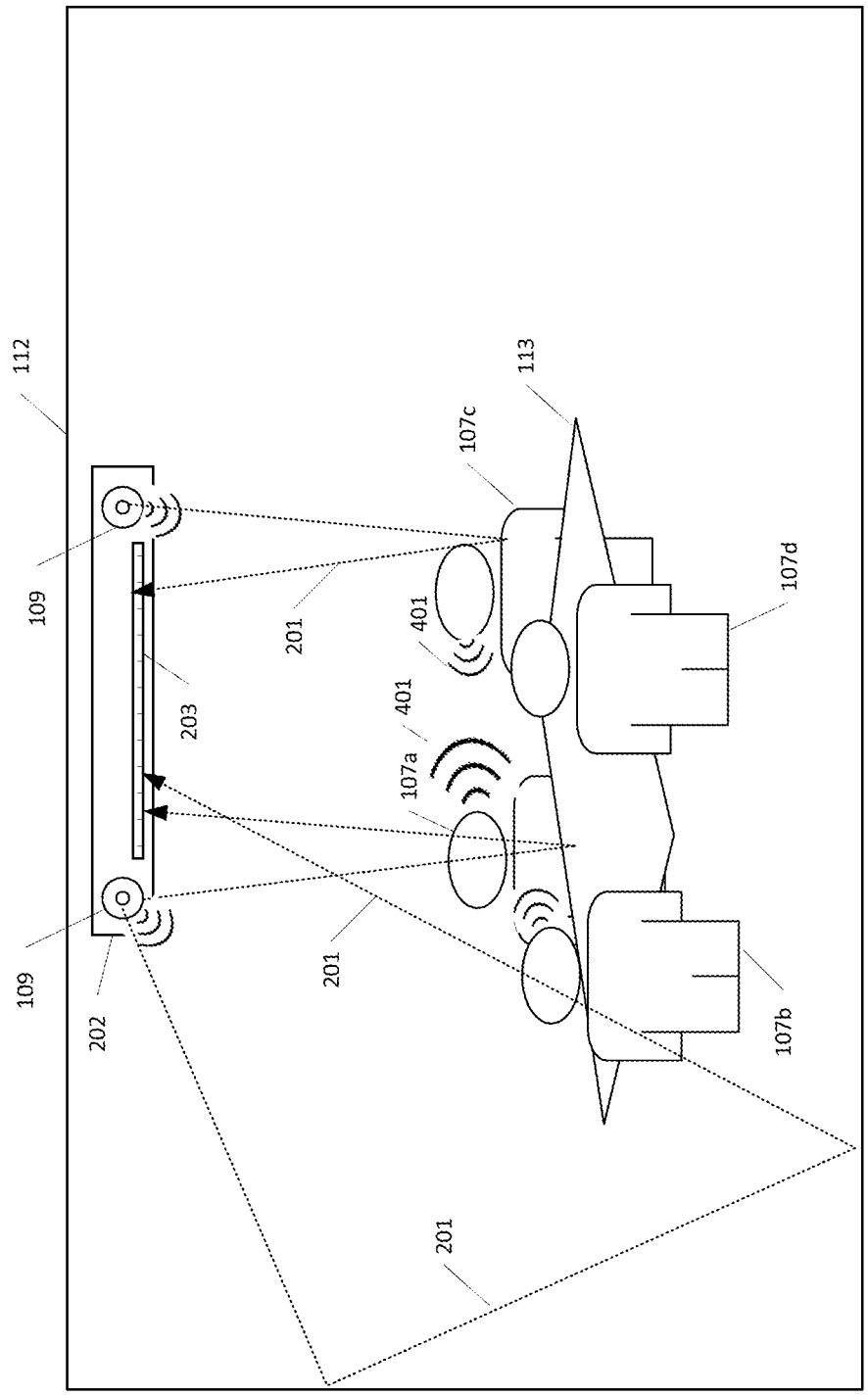
FIG. 4 Dynamic Sound Mask (Room Transfer Function) Microphone Array and Speaker System

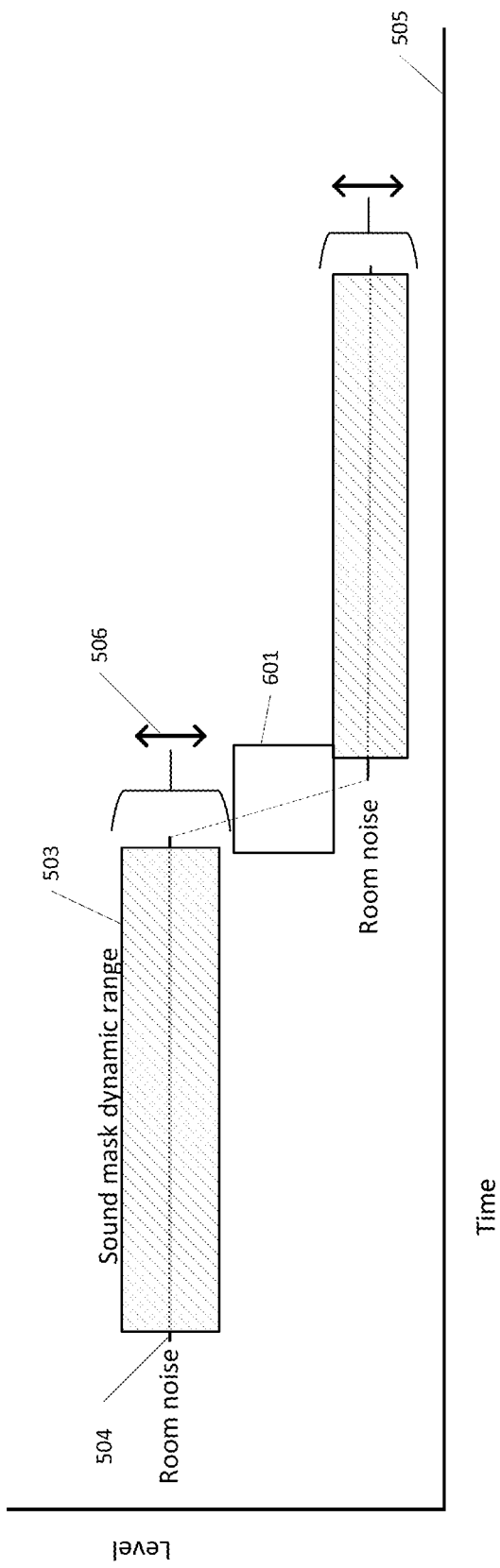

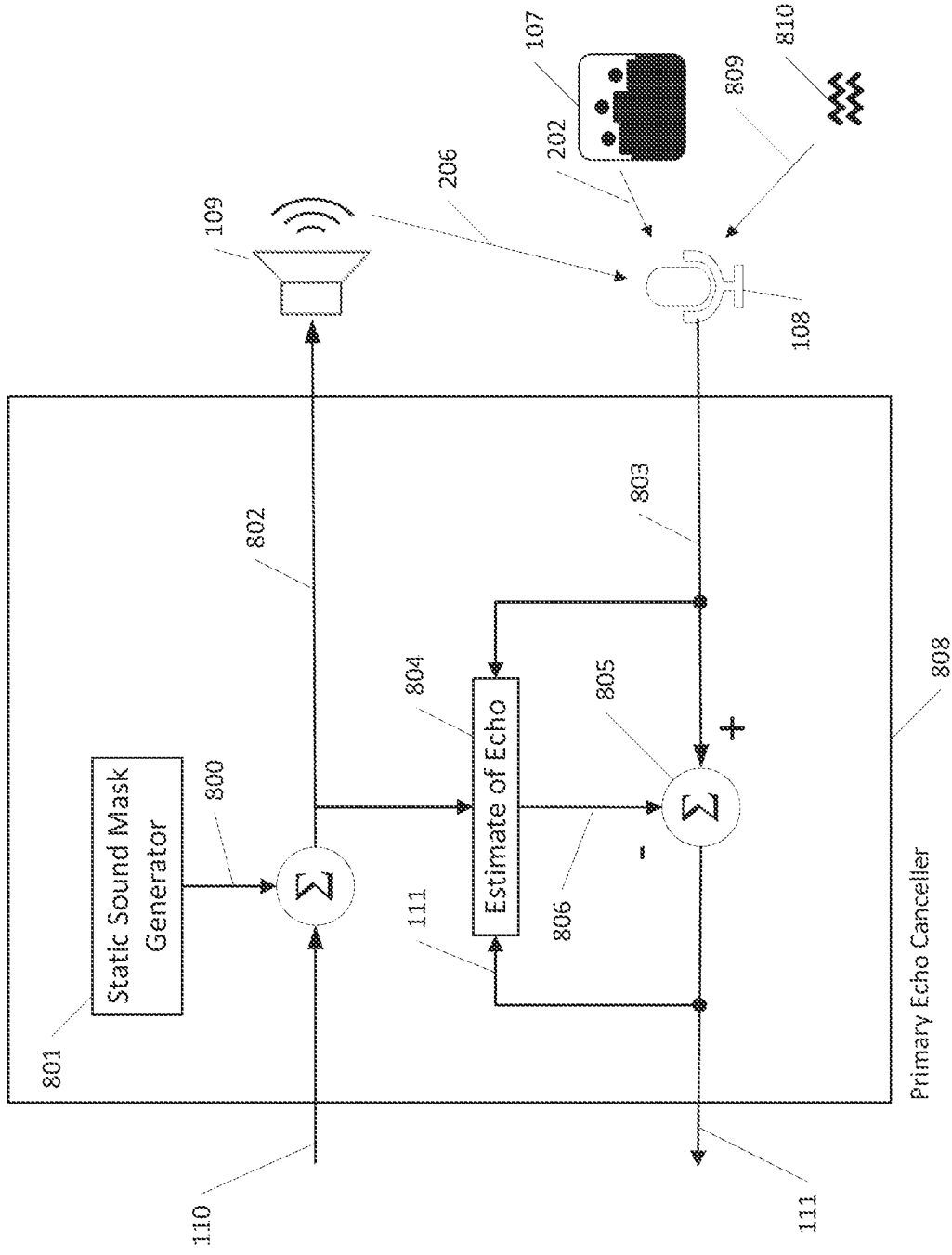
FIG. 8a Current Art – Static Sound Mask Generator

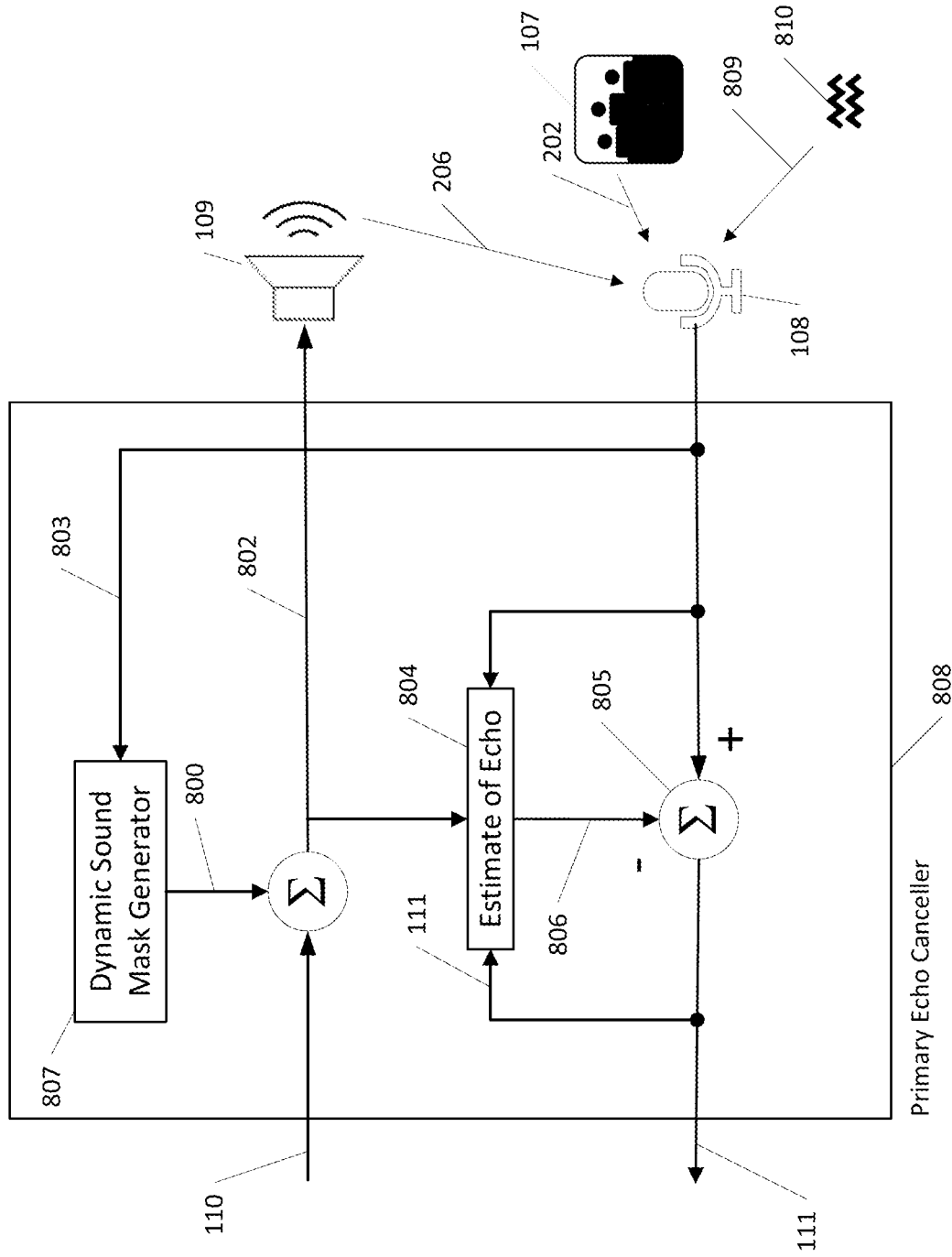
FIG. 8b Invention - Sound Mask Generator using Raw Microphones

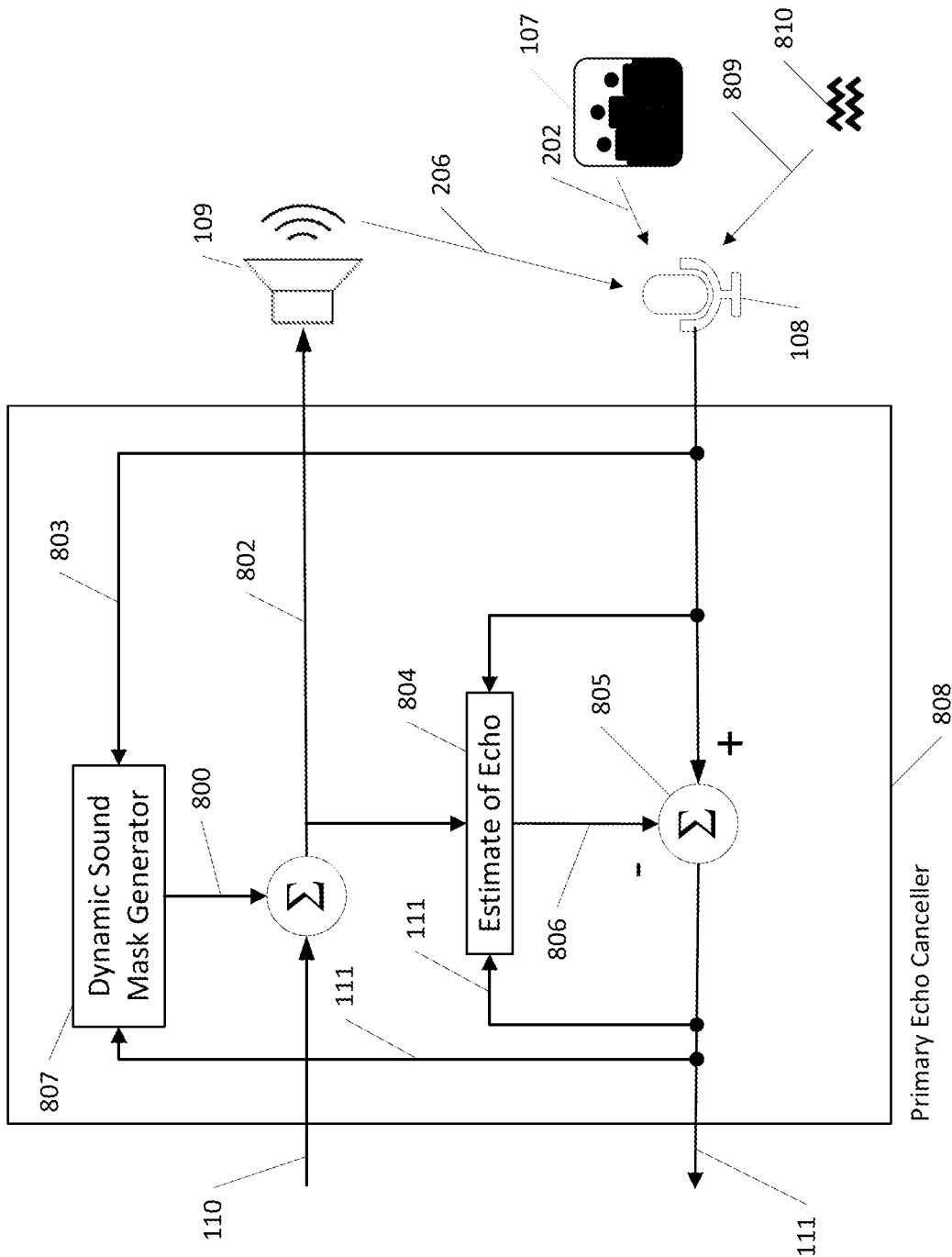
FIG. 8c Invention - Sound Mask Generator using Echo Cancelled Microphones

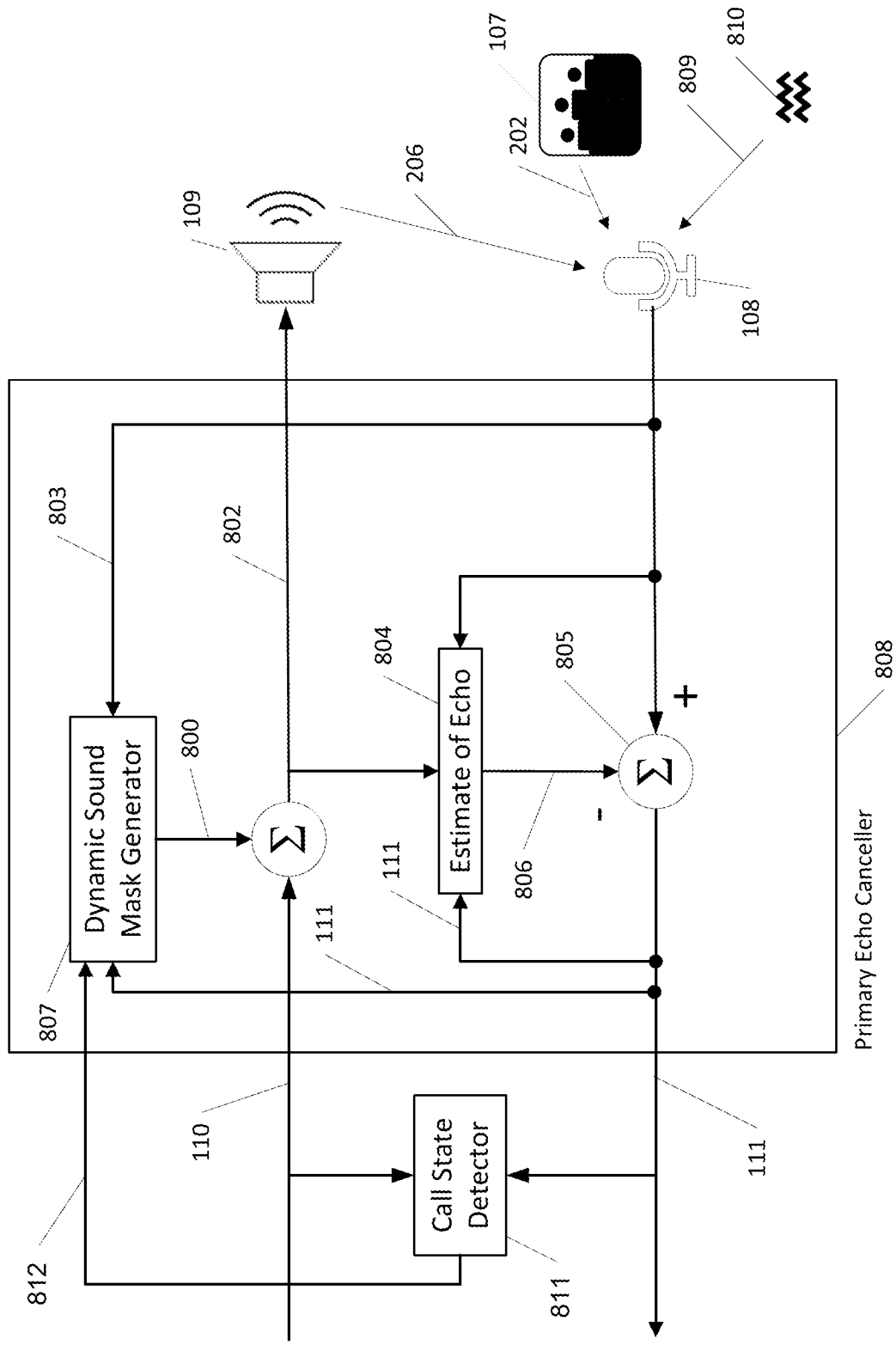
FIG. 8d Invention - Sound Mask Generator using Echo Cancelled Microphones

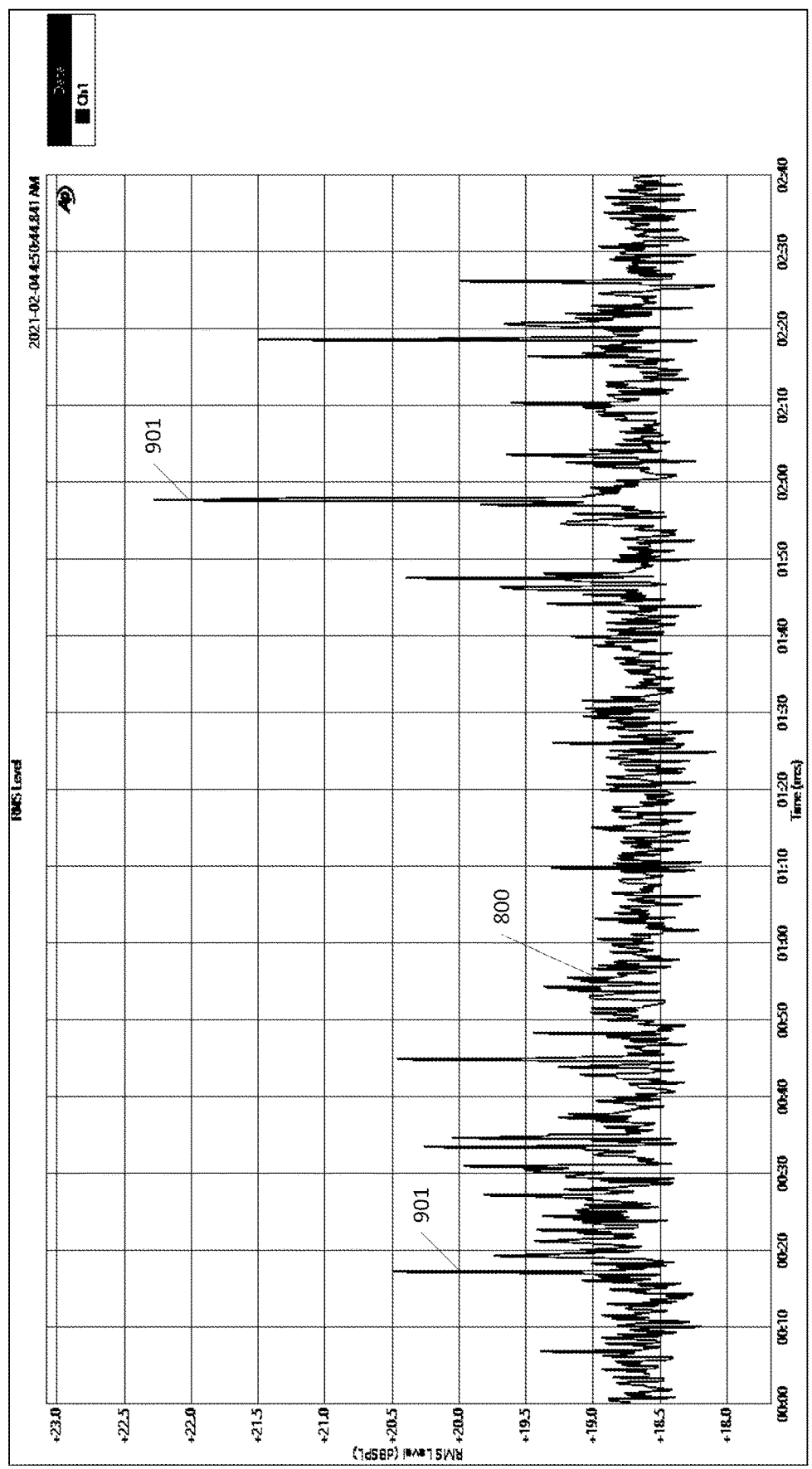
FIG. 9 Sound Mask with Noise Transients Waveform

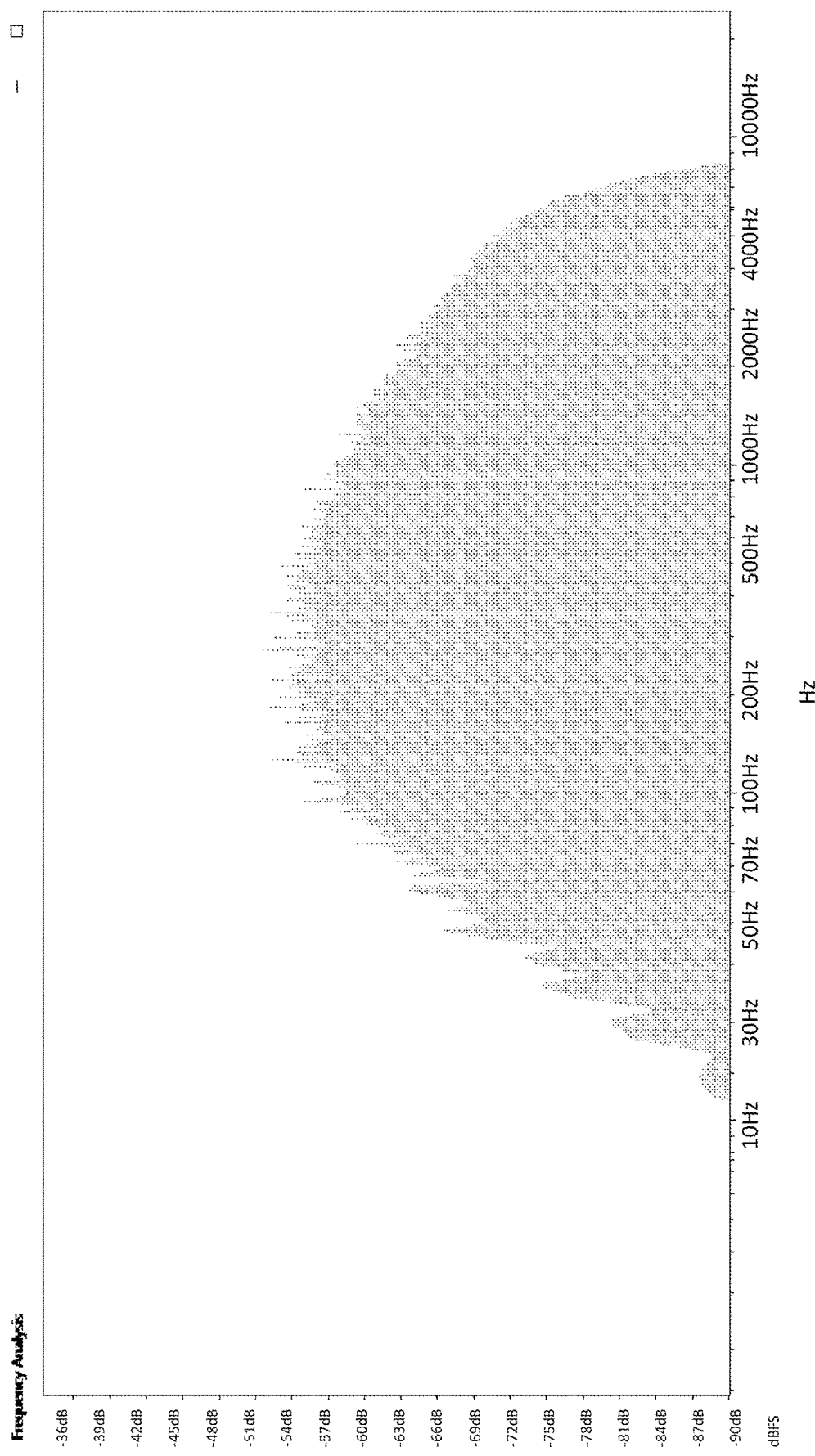
FIG. 10a Prior art Sound Mask Spectrum (Log scale)

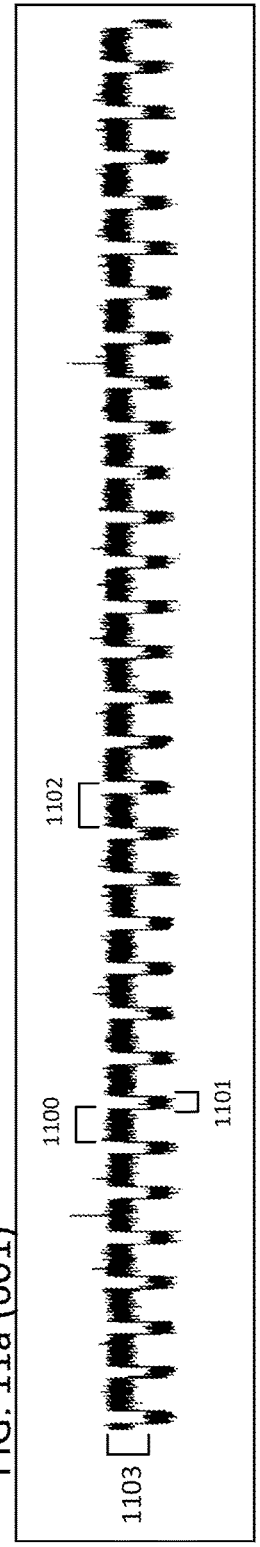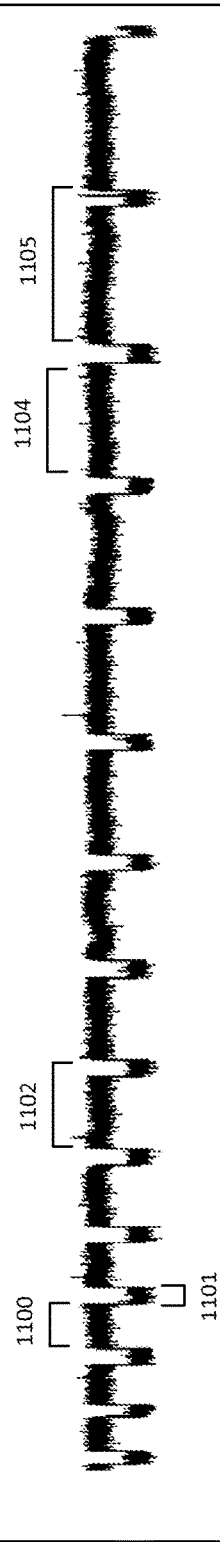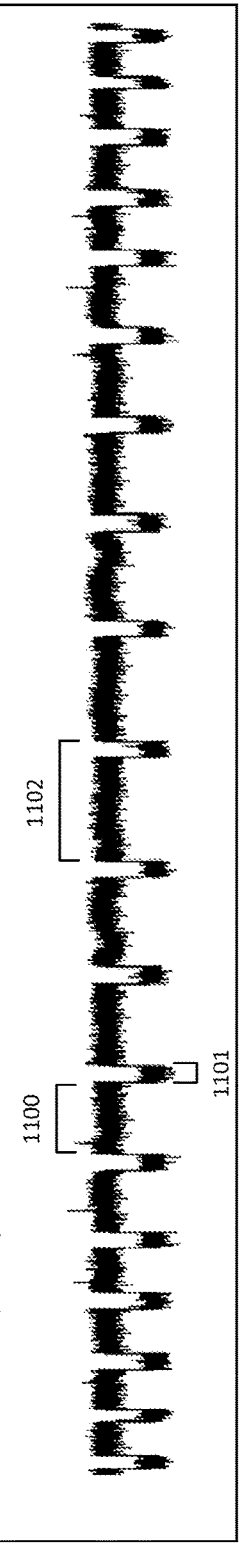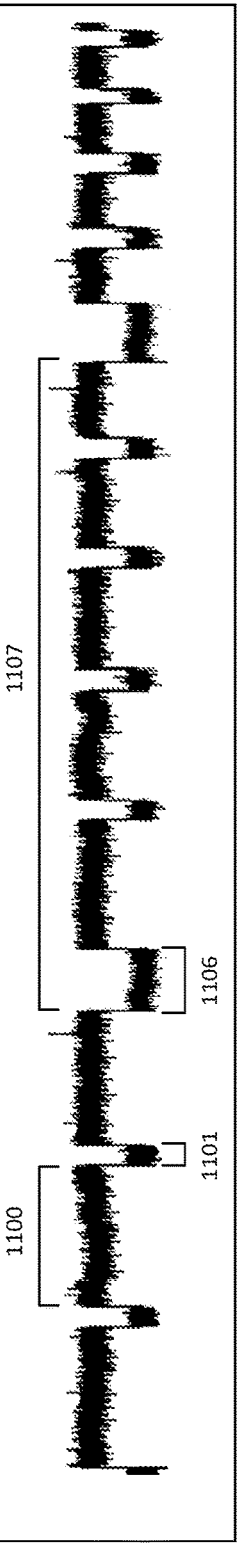
Sound Mask Rate Change Examples
FIG. 11a (601)
FIG. 11b (601)
FIG. 11c (601)
FIG. 11d (601)

Sound Mask Step Change Examples
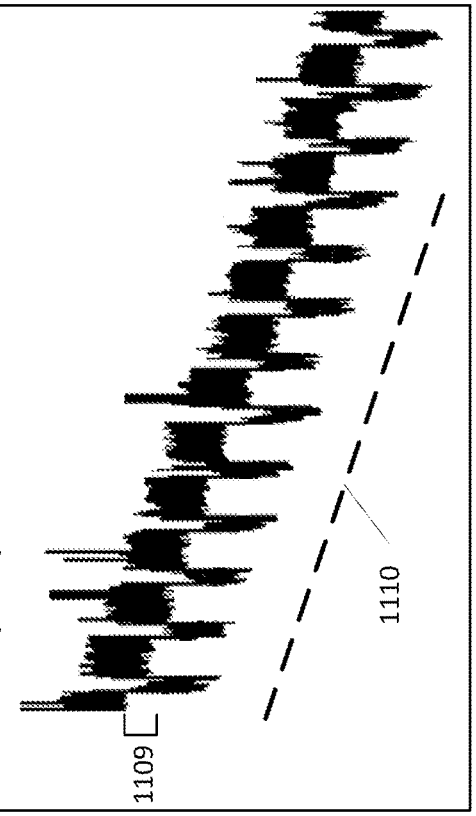
FIG. 11e (601)
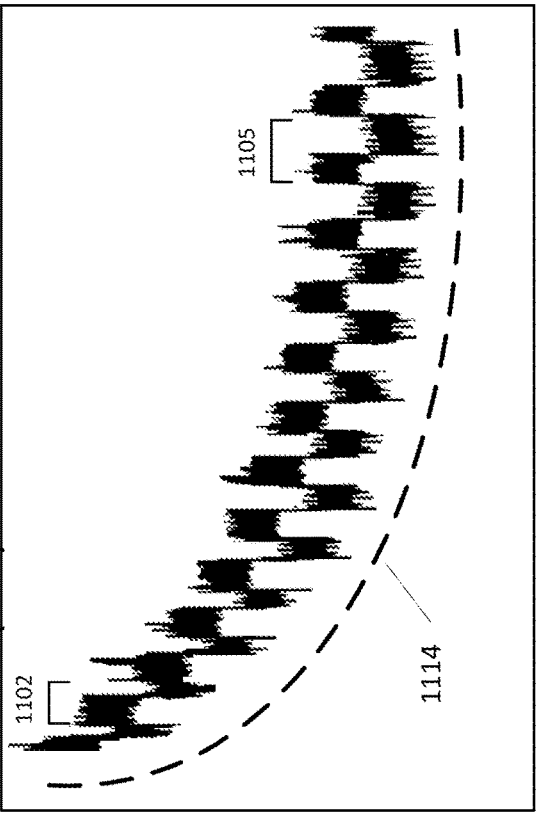
FIG. 11f (601)
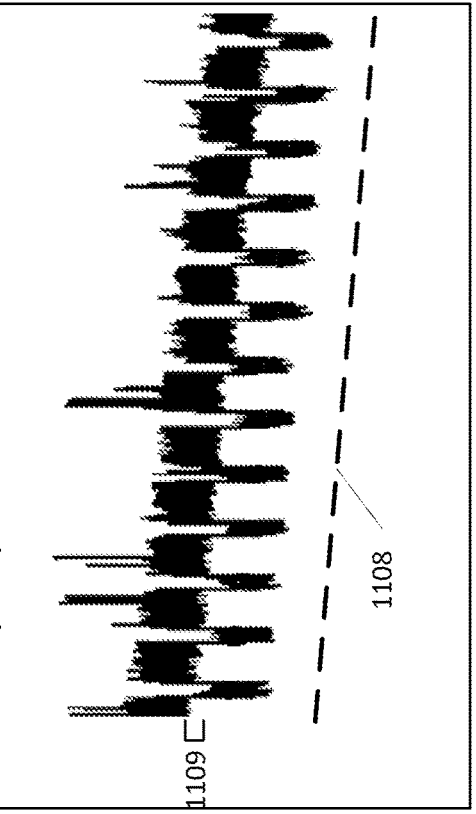
FIG. 11g (601)
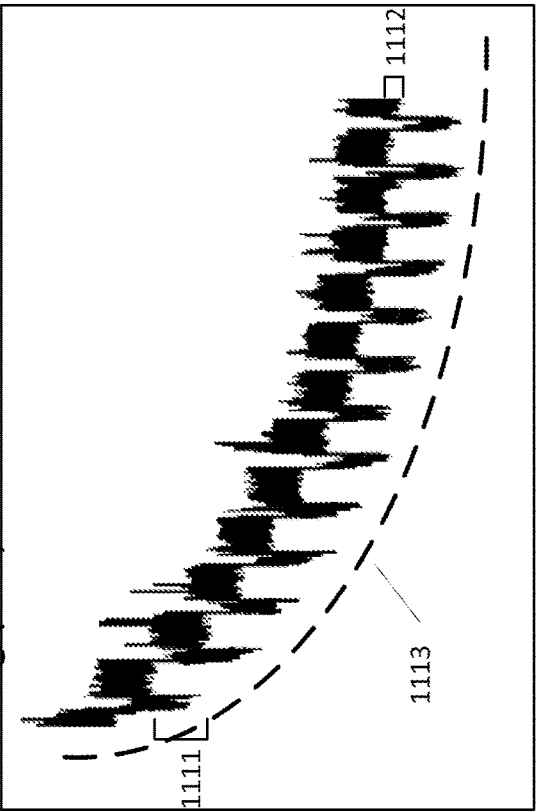
FIG. 11h (601)

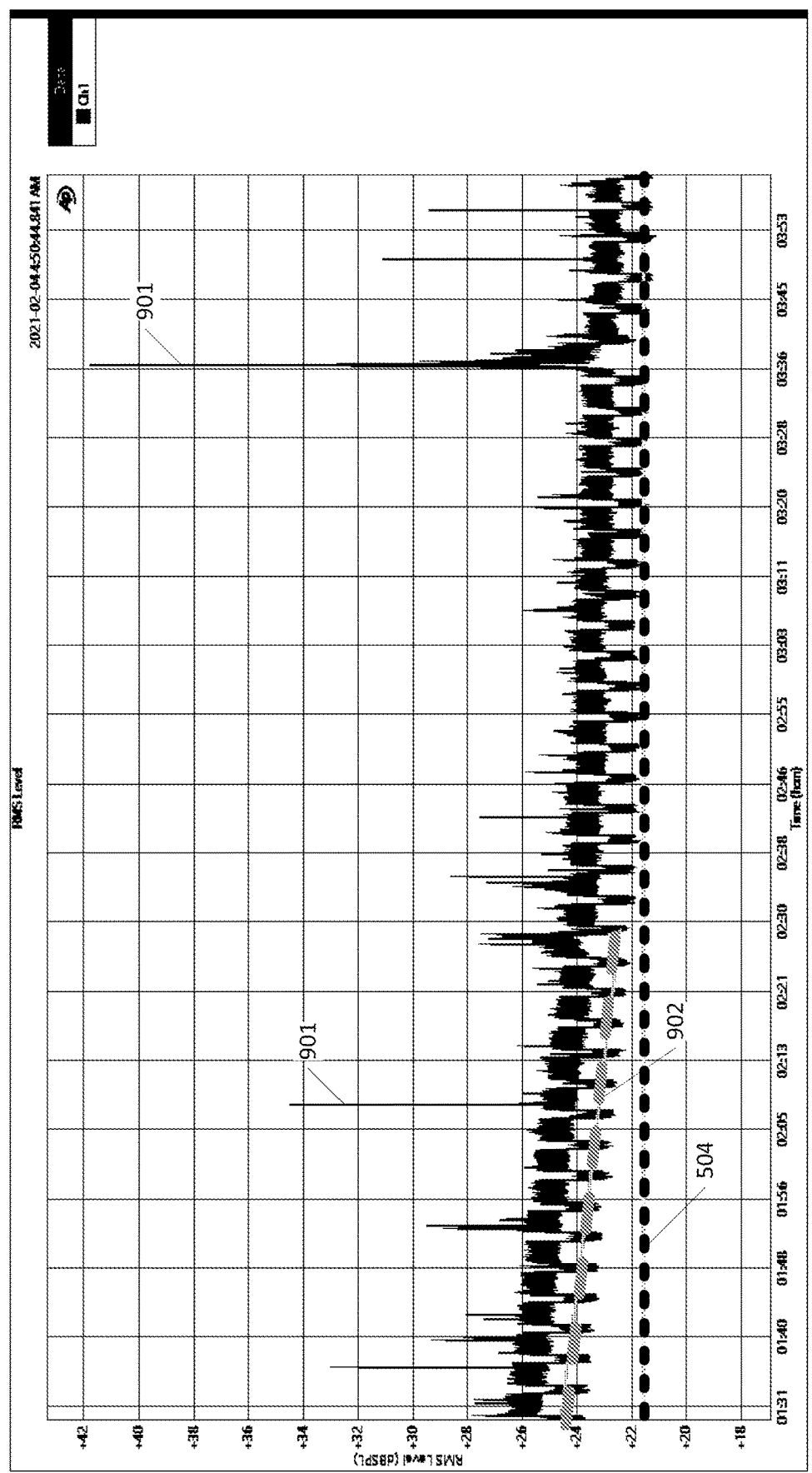
FIG. 12a Dynamic Sound Mask Change Slope

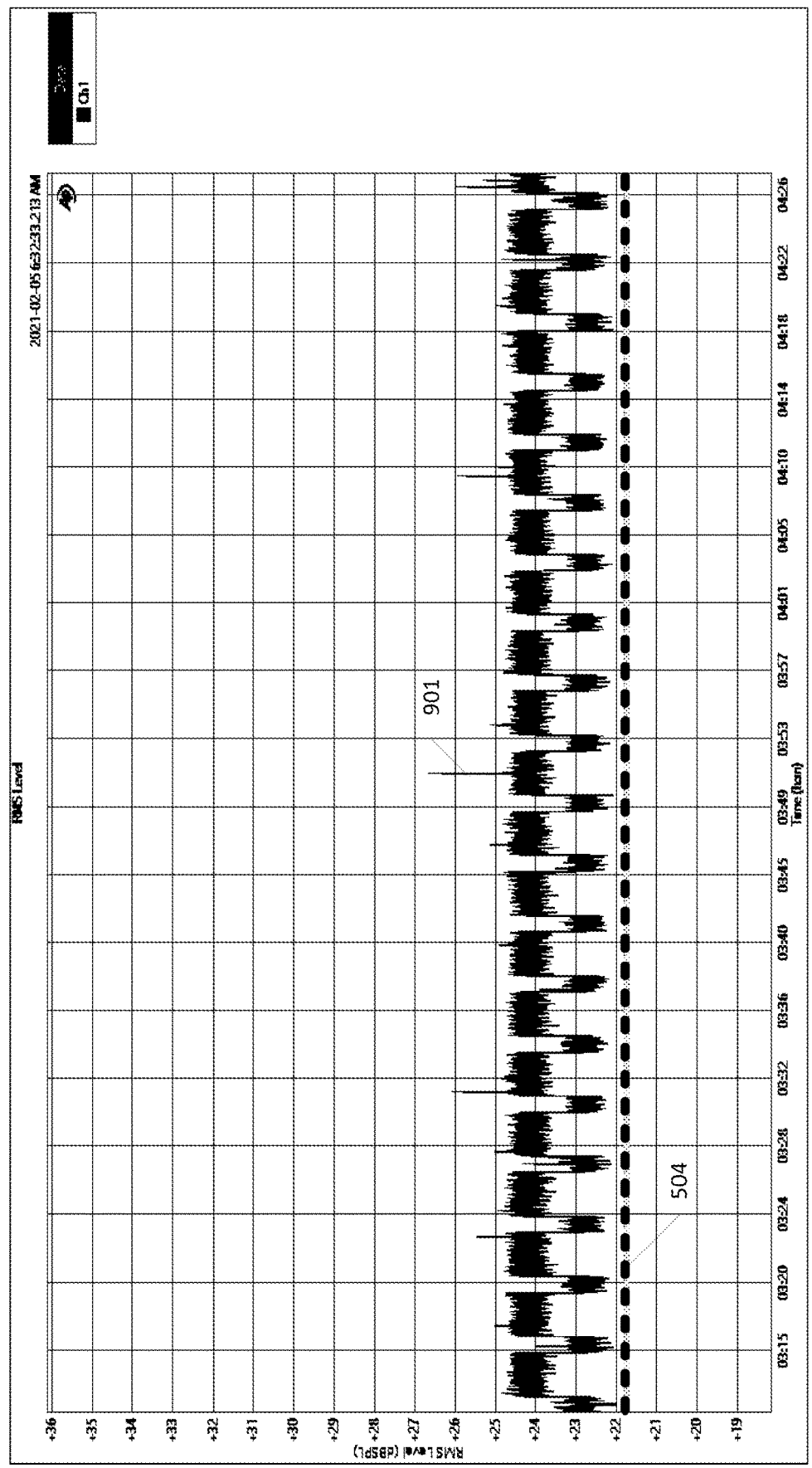
FIG. 12b Dynamic Sound Mask Steady State

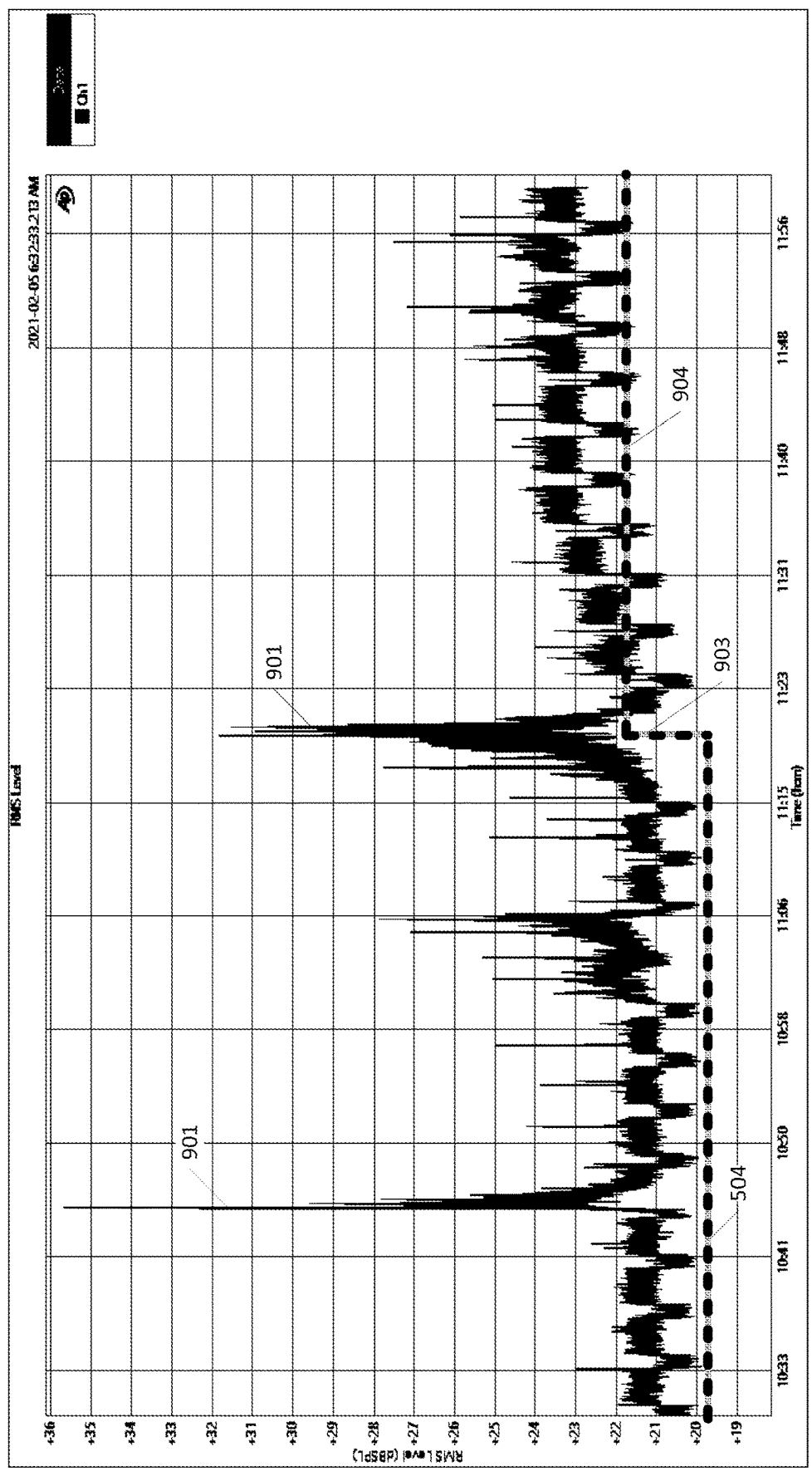
FIG. 12c Dynamic Sound Mask Background Noise Level Jump

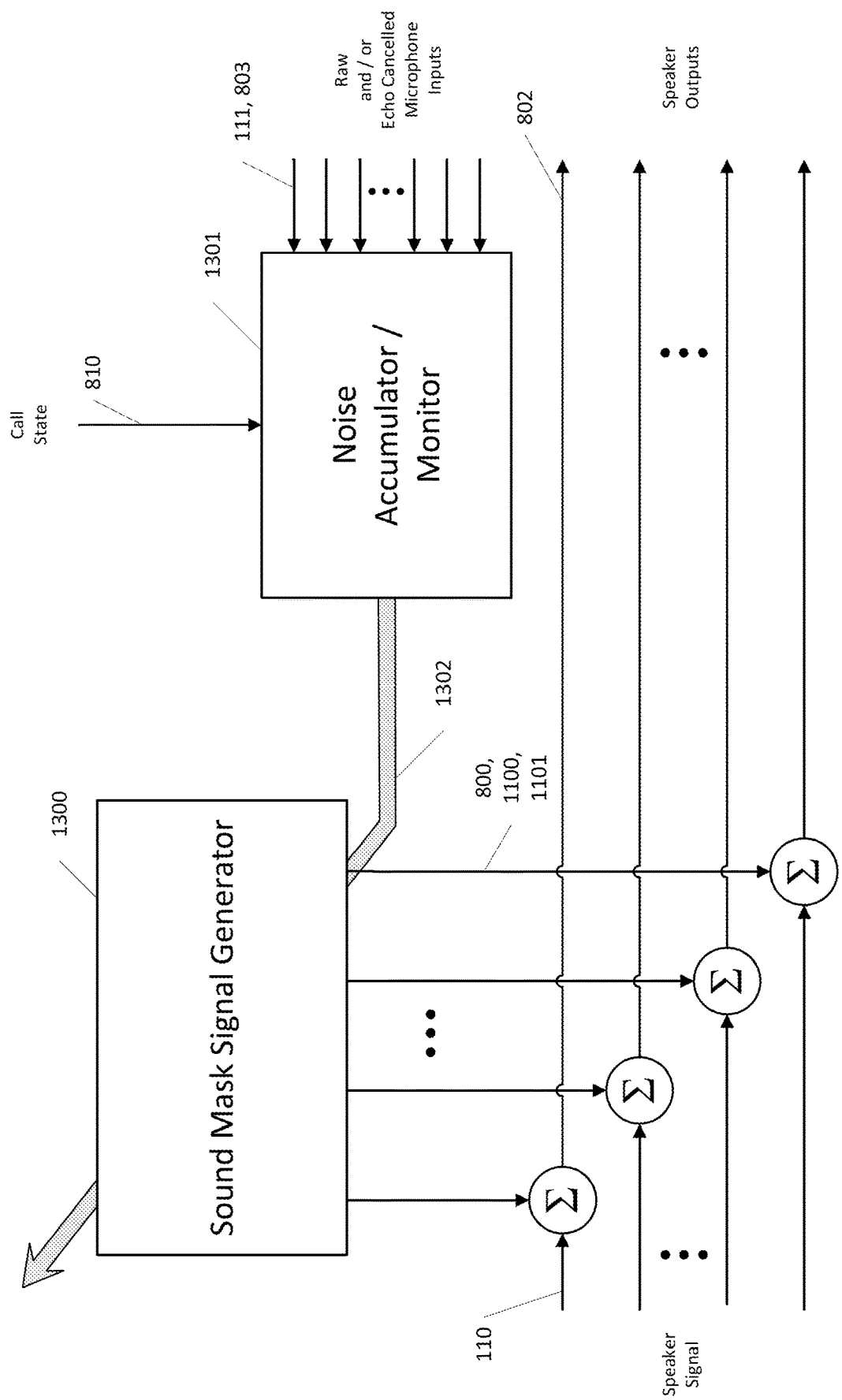
FIG. 13 (807) Dynamic Sound Mask Generator Functional Diagram

FIG. 14a Dynamic Sound Mask Adjustment Flowchart
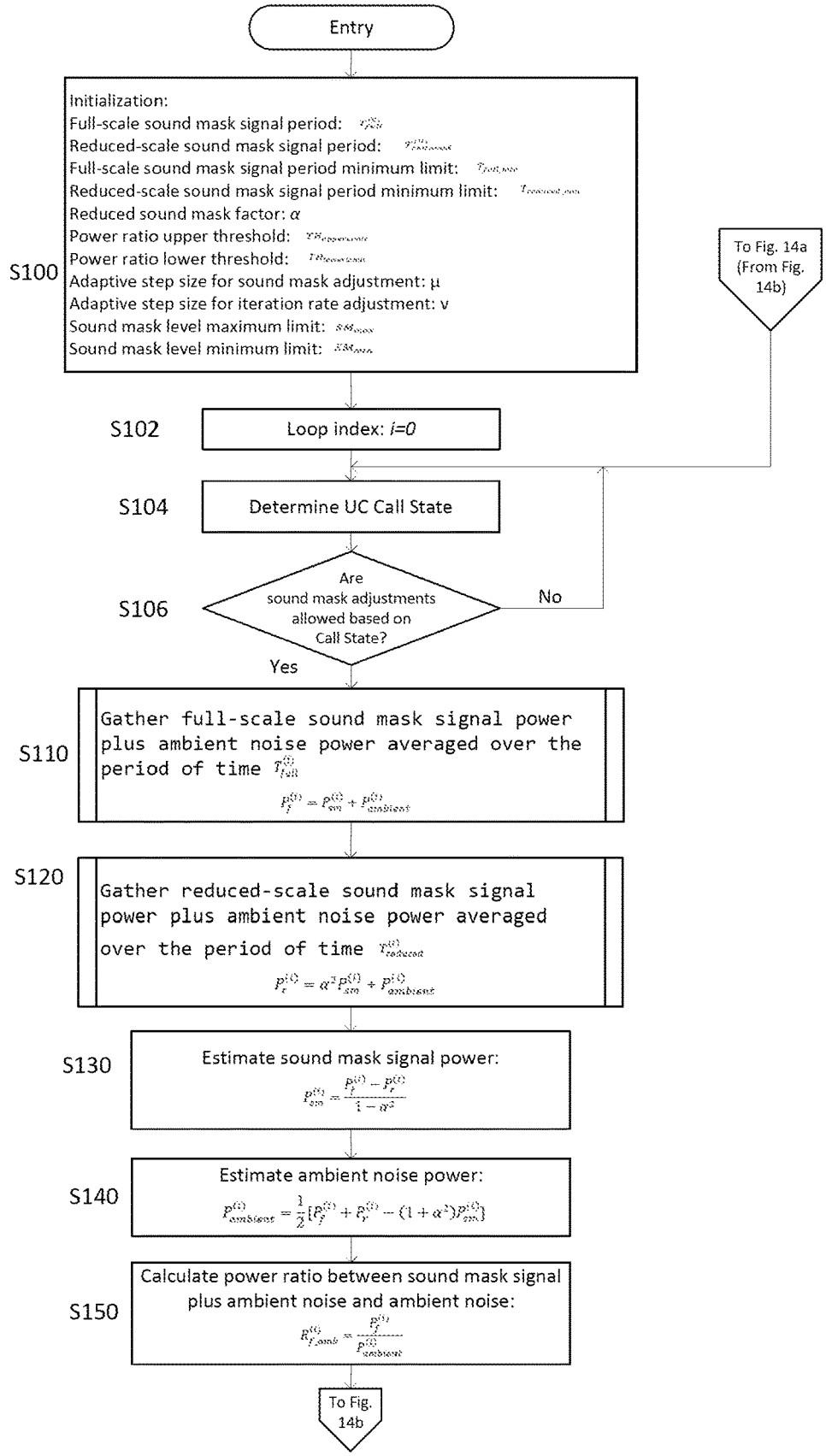

FIG. 14b Dynamic Sound Mask Adjustment Flowchart
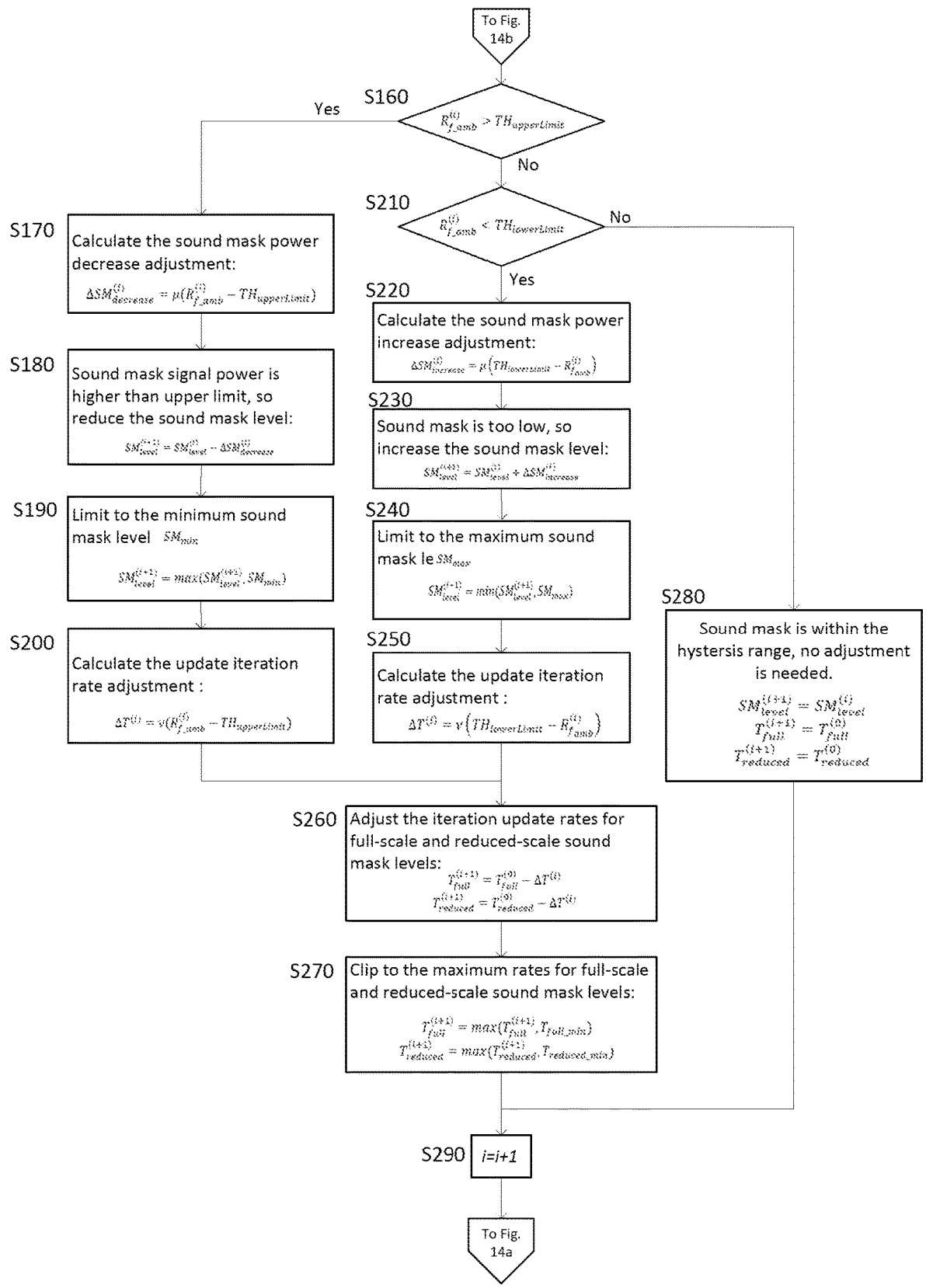

SYSTEM FOR DYNAMICALLY ADJUSTING A SOUNDMASK SIGNAL BASED ON REALTIME AMBIENT NOISE PARAMETERS WHILE MAINTAINING ECHO CANCELLER CALIBRATION PERFORMANCE

CROSS REFERENCE TO RELATED APPLICATIONS

This application claims the priority of U.S. Provisional Application Ser. No. 63/214,871, filed on Jun. 25, 2021, which is hereby incorporated herein by reference in its entirety.

BACKGROUND OF THE INVENTION

1. Field of the Invention

The present invention generally relates to audio conference systems, and more particularly, to echo cancelation and suppression calibration methods utilizing a real-time and continuous calibration signal in a bi-directional audio communications link for multi-user conference situations to optimize audio signal and noise level performance.

2. Description of Related Art

Obtaining high quality audio at both ends of a conference call is difficult to manage due to, but not limited to, variable room dimensions, dynamic seating plans, roaming participants, unknown number of microphones and locations, unknown speaker system locations, known steady state and unknown dynamic noise, variable desired sound source levels, and unknown room reverberation characteristics. This may result in conference call audio having a combination of desired sound sources (participants) and undesired sound sources (return speaker echo signals, etc.). Because the microphone system is typically not able to differentiate the desired sound sources from the undesired sound sources, this can result in a distorted received microphone signal that often requires complex echo filtering which usually requires some form of manual calibration process. In a simple system such as a tabletop combination speaker and microphone system, manual calibration is relatively straight forward. However, as the conference system becomes more complex with multiple speakers and microphones installed in the room, the calibration process increases in complexity and duration. If the room setup, usage and arrangement (including a change of location of the audio conference speakers and microphones) occurs, the calibration of the system will need to be redone to ensure optimum audio performance on the conference call.

The optimum solution would be to have a conference system that is able to calibrate an echo canceller in real-time to accommodate for changes in the room and conference system. However, fully automating the audio echo calibration process and solving such problems has proven difficulties and insufficiencies within the current art.

When a remote conference participant (far-end) speaks during the conference call, the conference room (near-end) will hear the remote participants' voice through the in-room conference speaker system. The conference room (near-end) microphone system will also pick-up the conference speaker systems output signal(s). Such signal(s) are referred to as the undesired sound source (e.g., return speaker echo signal). If a near-end conference participant (desired sound source) happens to speak at the same time, the microphone system will also pick up this signal. The resultant near-end microphone signal will be a combination of desired and undesired sound sources. The undesired sound source needs to be removed from the audio signal as it may be fed back to the remote participant who will hear this signal as an echo signal (return speaker echo signal) of their voice. If this scenario is allowed to persist, the echo signal can cause significant distortion and may create a feedback 'howl' which can overload the system. In a full duplex system when the remote participant and the near-end participant are talking at the same time (double talk), the return echo signal can be very difficult to remove without distorting the desired near-end participant signal.

A calibration process is preferably required which seeds an echo canceller circuit with an approximation of the return echo signal by measuring the room transfer function (speaker to room to microphone) relationships between the individual system speakers, the room boundaries and the individual system microphones. The return echo signal is made up of the content (audio of the remote talker) of the audio broadcast out of the speaker system and the time-of-flight room reflections known as the room transfer function (RTF) picked up by the microphone system. A calibration process is undertaken to measure the RTF response of the conference system with respect to the specific room it is installed in and to apply the RTF calibration to the return echo canceller circuit of the audio conference system with the goal of cancelling out the return echo that would normally be perceived at the far-end of a conference call if no echo canceller circuit was utilized.

In the currently known art there have been various approaches to solving the complex problem of obtaining a room transfer function (RTF) calibration. Typically, some sort of manual process is undertaken by an audio technician once the conference system has been installed. The calibration process is considered an offline process to be done by an audio technician or perhaps an individual from IT, which means the audio system is not able to be utilized during the calibration procedure. The calibration procedure preferably uses some sort of pulsed tone or signal that resolves into an impulse response allowing for a time-of-flight measurement between the speaker's system and the receiving of the signal by the microphone. The time-of-flight parameter of the signal is determined by the distance of the room boundaries (i.e., floor, ceiling and walls) or other objects such as chairs, tables and collaboration devices which reflect the signal back to the microphone. The calibration signal between each individual speaker and microphone combination needs to be determined because each speaker and microphone combination will result in a unique set of calibration parameters (i.e., RTF) due to their respectively unique location to each other and their unique relationship to the room boundaries and objects in the room.

It should be noted that the RTF echo calibration is valid within constrained criteria such as but not limited to, the audio conference equipment is not moved, the location of the room boundaries has not been altered, the material makeup of the room boundaries be it material such as concrete, wood, glass and/or some combination of, or acoustic treatment has not been changed, furniture has not been adjusted and the room occupancy does not fluctuate greatly. If a change in one or a combination of the previous parameters has occurred, a new echo RTF calibration would need to be completed by an audio technician which in today's multiuse spaces would be impractical. The room must be taken out of service and cannot be used for a conference call until the system has undergone a new calibration procedure as the calibration tone is usually intrusive and can be loud. As an added constraint the calibration process typically requires the room to be maintained in a silent state while the calibration procedure is undertaken to ensure an accurate calibration is completed.

To overcome limitations cited above, a continuous echo RTF calibration method can be implemented as outlined in U.S. Pat. No. 10,499,151, entitled "System and Method for Embedding Additional Information in a Sound Mask Noise Signal," issued Dec. 3, 2019, which is hereby incorporated by reference. Although previous constraints have been eliminated by continuously calibrating the echo canceller via a sound mask impulse response measurement, it has become apparent that the ability to maintain and adjust the level of the calibration signal in real-time in relation to the ambient background noise is desirable to improve performance in noisy environments and minimize the potential of unwanted distractions (especially in small spaces) in quieter environments.

Therefore, the current art is not able to provide an imperceptible and continuous echo canceller calibration signal in real-time in relation to dynamically changing background noise during audio bi-directional communication taking into account multiple microphone-to-speaker combinations, complex in-room reverberation, and return echo signals.

Book 1: "Sound Capture and Processing: Practical Approaches", Ivan Jelev Tashev, Microsoft Research, USA. First published 2009 describes causes and prior art solutions for such problems as are discussed above.

SUMMARY OF THE INVENTION

An object of the present embodiments is to, in real-time, dynamically adjust a continuous echo calibration signal based on the measured ambient noise profile regardless of the number of microphone and speaker combinations or placements within the shared sound space environment. More specifically, it is an object of the invention to preferably adjust the continuous echo calibration signal parameters such as, but not limited to, signal level, rate of change, and step size relative to changes and level of ambient noise for the purpose of measuring the room transfer function derived primary acoustic echo canceler (AEC) echo estimate such that the echo canceller performance is maintained while minimizing the audible intrusion and impact to the people in the shared space. The method may reduce, raise, or eliminate the continuous calibration signal depending on desired performance criteria. The ability to dynamically adjust the echo calibration signal in real time in relation to the ambient room noise overcomes the limitations of the prior art which are less adaptive real-time or manual, intrusive echo canceller calibration methods.

The present invention provides a real-time adaptable solution to undertake an unobtrusive continuous echo canceller RTF calibration process to calibrate the conference system echo canceller for the purpose of reducing echo return signals within complex systems and multiuse shared spaces.

The preferred embodiments comprise both algorithms and hardware accelerators to implement the structures and functions described herein.

These advantages and others are achieved, for example, by a method for dynamic sound mask adjustment wherein the sound mask is used for obtaining an impulse response measurement that adjusts a generated sound mask dynamically based on real-time ambient noise parameters, while maintaining echo canceller calibration performance. The method includes steps of summing a full-scale sound mask signal power and an ambient noise power averaged over a period of time, summing a reduced-scale sound mask signal power and the ambient noise power averaged over a period of time, estimating a sound mask signal power from the sum of the full-scale sound mask signal power and the ambient noise power and the sum of the reduced-scale sound mask signal power and the ambient noise power, estimating an ambient noise power from the sum of the full-scale sound mask signal power and the ambient noise power, the sum of the reduced-scale sound mask signal power and the ambient noise power, and the estimated sound mask signal power, calculating a power ratio between the sum of the full-scale sound mask signal power and the ambient noise power and the estimated ambient noise power, and determining whether the sound mask is in a hysteresis range. If the sound mask is not in the hysteresis range, the method adjust current sound mask power level and iteration update rate. If the sound mask is in the hysteresis range, the method maintains the current sound mask power and iteration update rate. The adjusting the current sound mask power level and iteration update rate comprises steps of calculating a sound mask power adjustment, adjusting the sound mask power by the calculated sound mask power adjustment, limiting the sound mask power level, calculating an update iteration rate adjustment, adjusting an iteration update rate, and clipping the iteration update rate to a maximum rate.

These advantages and others are achieved, for example, by a system for dynamic sound mask adjustment wherein the sound mask is used for obtaining an impulse response measurement that adjusts a generated sound mask dynamically based on real-time ambient noise parameters, while maintaining echo canceller calibration performance. The system includes a dynamic sound mask generator that comprises a noise accumulator and monitor that includes a processor and a memory including instructions executed by the processor for summing a full-scale sound mask signal power and an ambient noise power averaged over a period of time, summing a reduced-scale sound mask signal power and the ambient noise power averaged over a period of time, estimating a sound mask signal power from the sum of the full-scale sound mask signal power and the ambient noise power and the sum of the reduced-scale sound mask signal power and the ambient noise power, estimating an ambient noise power from the sum of the full-scale sound mask signal power and the ambient noise power, the sum of the reduced-scale sound mask signal power and the ambient noise power, and the estimated sound mask signal power, calculating a power ratio between the sum of the full-scale sound mask signal power and the ambient noise power and the estimated ambient noise power, and determining whether the sound mask is in a hysteresis range. If the sound mask is not in the hysteresis range, the processor executes instructions for adjusting current sound mask power level and iteration update rate. If the sound mask is in the hysteresis range, the processor executes instructions for maintaining the current sound mask power and iteration update rate. The adjusting the current sound mask power level and iteration update rate comprises steps of calculating a sound mask power adjustment, adjusting the sound mask power by the calculated sound mask power adjustment, limiting the sound mask power level, calculating an update iteration rate adjustment, adjusting an iteration update rate, and clipping the iteration update rate to a maximum rate.

These advantages and others are achieved, for example, by a computer-readable medium for dynamic sound mask adjustment wherein the sound mask is used for obtaining an impulse response measurement that adjusts a generated sound mask dynamically based on real-time ambient noise parameters, while maintaining echo canceller calibration performance, by steps of summing a full-scale sound mask signal power and an ambient noise power averaged over a period of time, summing a reduced-scale sound mask signal power and the ambient noise power averaged over a period of time, estimating a sound mask signal power from the sum of the full-scale sound mask signal power and the ambient noise power and the sum of the reduced-scale sound mask signal power and the ambient noise power, estimating an ambient noise power from the sum of the full-scale sound mask signal power and the ambient noise power, the sum of the reduced-scale sound mask signal power and the ambient noise power, and the estimated sound mask signal power, calculating a power ratio between the sum of the full-scale sound mask signal power and the ambient noise power and the estimated ambient noise power, determining whether the sound mask is in a hysteresis range, if the sound mask is not in the hysteresis range, the steps further comprises calculating a sound mask power adjustment, adjusting the sound mask power by the calculated sound mask power adjustment, limiting the sound mask power level, calculating an update iteration rate adjustment, adjusting an iteration update rate, and clipping the iteration update rate to a maximum rate. If the sound mask is in the hysteresis range, the instructions maintain the current sound mask power and iteration update rate.

BRIEF DESCRIPTION OF THE DRAWINGS

The preferred embodiments described herein and illustrated by the drawings hereinafter be to illustrate and not to limit the invention, where like designations denote like elements.

FIG. 2a is a diagrammatic illustration of echo canceler calibration signals with a distributed microphone and speaker system.

FIGS. 3a, 3b, 3c and 3d are illustrative examples of manually calibrating an echo canceler in the current art.

FIG. 4 is a diagrammatic example of the preferred embodiment calibrating with a sound mask signal not requiring manual intervention.

FIGS. 6a and 6b are graphical examples of a further embodiment of the present invention.

FIG. 8a is a concept illustration of a current art sound mask generator functionality.

FIGS. 8b, 8c and 8d are concept illustrations of an exemplary embodiment of an improved sound mask processing.

FIG. 9 is a prior art graphical capture of the sound mask signal amplitude vs time.

FIG. 10a is a prior art graphical capture of the sound mask signal amplitude vs frequency.

FIGS. 11a, 11b, 11c and 11d are graphical illustrations of the sound mask rate change adjustments.

FIGS. 11e, 11f, 11g and 11h are graphical illustrations of the sound mask step change adjustments.

FIGS. 12a, 12b and 12c are graphical illustrations of the sound mask adjusting to ambient noise conditions.

FIG. 13 is a structural and functional diagram of the audio system incorporating the dynamic sound mask signal generator functionality, according to an embodiment of the present invention.

FIGS. 14a and 14b are logic flowcharts of the dynamic sound mask generator functionality.

DETAILED DESCRIPTION OF THE PRESENTLY

Figure 1:
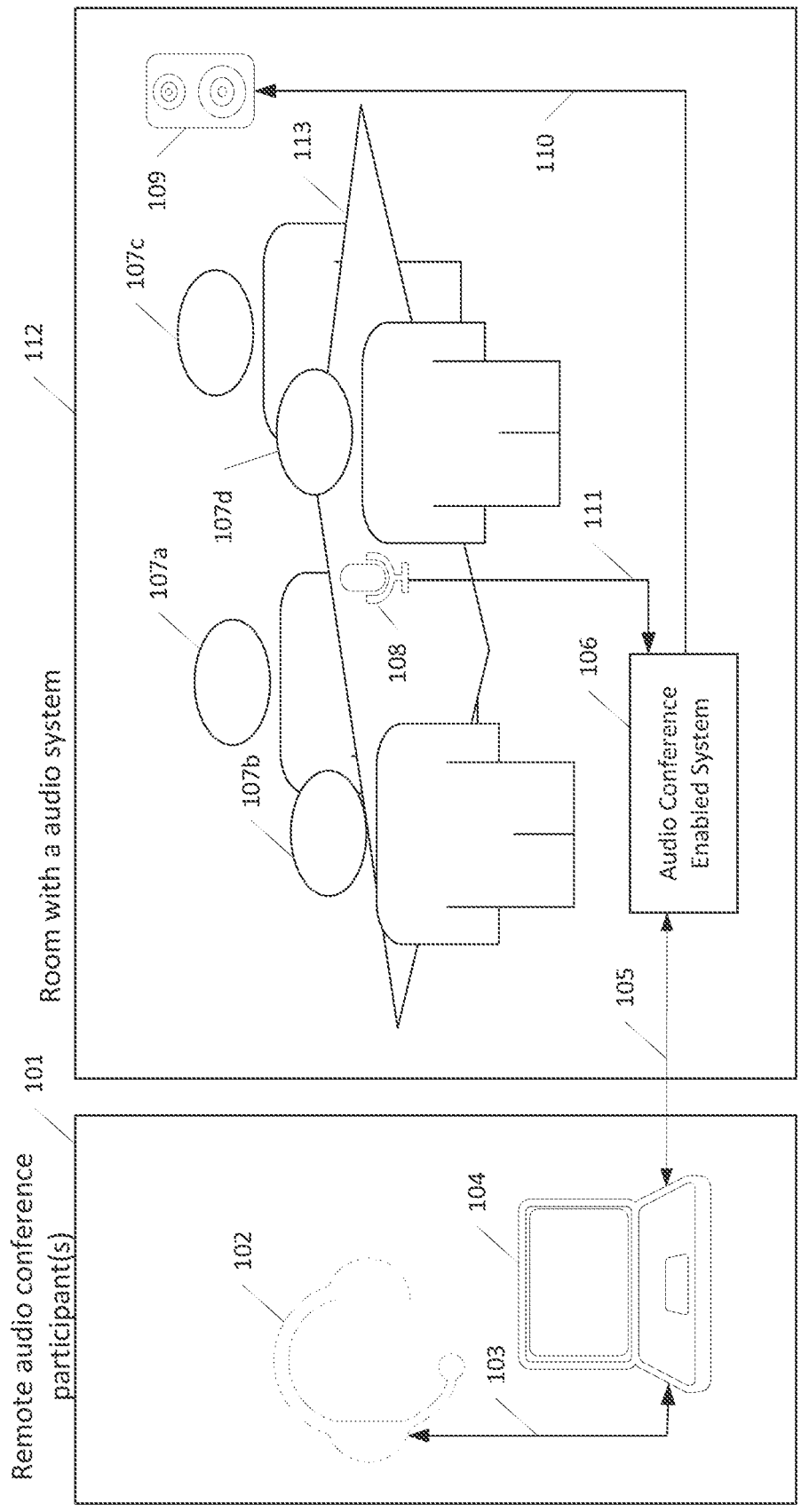
FIG. 1 is a diagrammatic illustration of a typical audio conference setup.

The present invention is directed to apparatus and methods that enable groups of people (and other sound sources, for example, recordings, broadcast music, Internet sound, etc.), known as "participants", to join together over a network, such as the Internet or similar electronic channel(s), in a remotely-distributed real-time fashion employing personal computers, network workstations, and/or other similarly connected appliances, often without face-to-face contact, to engage in effective audio conference meetings that utilize large multi-user rooms (spaces) with distributed participants.

Advantageously, embodiments of the present apparatus and methods afford an ability to provide all participants in the room with a continuous and imperceptible audio system calibration signal without compromising the audio systems ability to properly calibrate the audio system and end user experience having all sound sources transmitted with significantly reduced return echo signals, regardless of the number potential return echo signals created, while maintaining optimum audio quality for all conference participants.

A notable challenge to echo canceler calibration is creating a calibration signal that is both continuous and unobtrusive to persons in the room while providing a signal of sufficient volume to calibrate the complex speaker-to-microphone signal relationships. These relationships can be combinations of many things like changing characteristics of reverberant rooms, or people/objects moving about the room resulting in a wide range of situations to anticipate and calibrate for, while maintaining appropriate adaptive echo canceller coefficients and compensation factors affecting the audio sound quality for all participant(s) on the audio call.

A "conference enabled system" in this specification may include, but is not limited to, one or more of, any combination of device(s) such as, UC (unified communications) compliant devices and software, computers, dedicated software, audio devices, cell phones, a laptop, tablets, smart watches, a cloud-access device, and/or any device capable of sending and receiving audio signals to/from a local area network or a wide area network (e.g. the Internet), containing integrated or attached microphones, amplifiers, speakers and network adapters. PSTN, Phone networks etc.

A "microphone" in this specification may include, but is not limited to, one or more of, any combination of transducer device(s) such as, condenser mics, dynamic mics, ribbon mics, USB mics, stereo mics, mono mics, shotgun mics, boundary mic, small diaphragm mics, large diaphragm mics, multi-pattern mics, strip microphones, digital microphones, fixed microphone arrays, dynamic microphone arrays, beam forming microphone arrays, and/or any transducer device capable of receiving acoustic signals and converting to electrical signals, and or digital signals.

A "communication connection" in this specification may include, but is not limited to, one or more of or any combination of network interface(s) and devices(s) such as, Wi-Fi modems and cards, internet routers, internet switches, LAN cards, local area network devices, wide area network devices, PSTN, Phone networks etc.

A "device" in this specification may include, but is not limited to, one or more of, or any combination of processing device(s) such as, a cell phone, a Personal Digital Assistant, a smart watch or other body-borne device (e.g., glasses, pendants, rings, etc.), a personal computer, a laptop, a pad, a cloud-access device, a white board, and/or any device capable of sending/receiving messages to/from a local area network or a wide area network (e.g., the Internet), such as devices embedded in cars, trucks, aircraft, household appliances (refrigerators, stoves, thermostats, lights, electrical control circuits, the Internet of Things, etc.).

A "participant" in this specification may include, but is not limited to, one or more of, any combination of persons such as students, employees, users, attendees, or any other general groups of people that can be interchanged throughout the specification and construed to mean the same thing. Who gathering into a room or space for the purpose of listening to and or being a part of a classroom, conference, presentation, panel discussion or any event that requires a public address system and a UCC connection for remote participants to join and be a part of the session taking place. Throughout this specification a participant is a desired sound source and the two words can be construed to mean the same thing.

A "desired sound source" in this specification may include, but is not limited to, one or more of a combination of audio source signals of interest such as: sound sources that have frequency and time domain attributes, specific spectral signatures, and/or any audio sounds that have amplitude, power, phase, frequency and time, and/or voice characteristics that can be measured and/or identified such that a microphone can be focused on the desired sound source and said signals processed to optimize audio quality before deliver to an audio conferencing system. Examples include one or more speaking persons, one or more audio speakers providing input from a remote location, combined video/audio sources, multiple persons, or a combination of these. A desired sound source can radiate sound in an omni-polar pattern and/or in any one or combination of directions from the center of origin of the sound source.

An "undesired sound source" in this specification may include, but is not limited to, one or more of a combination of persistent or semi-persistent audio sources such as: sound sources that may be measured to be constant over a configurable specified period of time, have a predetermined amplitude response, have configurable frequency and time domain attributes, specific spectral signatures, and/or any audio sounds that have amplitude, power, phase, frequency and time characteristics that can be measured and/or identified such that a microphone might be erroneously focused on the undesired sound source. These undesired sources encompass, but are not limited to, Heating, Ventilation, Air Conditioning (HVAC) fans and vents; projector and display fans and electronic components; white noise generators; any other types of persistent or semi-persistent electronic or mechanical sound sources; external sound source such as traffic, trains, trucks, etc.; and any combination of these. An undesired sound source can radiate sound in an omni-polar pattern and/or in any one or combination of directions from the center of origin of the sound source.

A "UCC or Unified Communication Client" is preferably a program that performs the functions of but not limited to messaging, voice and video calling, team collaboration, video conferencing and file sharing between teams and or individuals using devices deployed at each remote end to support the session. Sessions can be in the same building and/or they can be located anywhere in the world that a connection can be establish through a communications framework such but not limited to Wi-Fi, LAN, Intranet, telephony, wireless or other standard forms of communication protocols. The term "Unified Communications" may refer to systems that allow companies to access the tools they need for communication through a single application or service (e.g., a single user interface). Increasingly, Unified Communications have been offered as a service, which is a category of "as a service" or "cloud" delivery mechanisms for enterprise communications ("UCaaS"). Examples of prominent UCaaS providers include Dialpad, Cisco, Mitel, RingCentral, Twilio, Voxbone, 8×8, and Zoom Video Communications.

An "engine" is preferably a program that performs a core function for other programs. An engine can be a central or focal program in an operating system, subsystem, or application program that coordinates the overall operation of other programs. It is also used to describe a special-purpose program containing an algorithm that can sometimes be changed. The best-known usage is the term search engine which uses an algorithm to search an index of topics given a search argument. An engine is preferably designed so that its approach to searching an index, for example, can be changed to reflect new rules for finding and prioritizing matches in the index. In artificial intelligence, for another example, the program that uses rules of logic to derive output from a knowledge base is called an inference engine.

As used herein, a "server" may comprise one or more processors, one or more Random Access Memories (RAM), one or more Read Only Memories (ROM), one or more user interfaces, such as display(s), keyboard(s), mouse/mice, etc. A server is preferably apparatus that provides functionality for other computer programs or devices, called "clients." This architecture is called the client-server model, and a single overall computation is typically distributed across multiple processes or devices. Servers can provide various functionalities, often called "services", such as sharing data or resources among multiple clients, or performing computation for a client. A single server can serve multiple clients, and a single client can use multiple servers. A client process may run on the same device or may connect over a network to a server on a different device. Typical servers are database servers, file servers, mail servers, print servers, web servers, game servers, application servers, and chat servers. The servers discussed in this specification may include one or more of the above, sharing functionality as appropriate. Client-server systems are most frequently implemented by (and often identified with) the request-response model: a client sends a request to the server, which performs some action and sends a response back to the client, typically with a result or acknowledgement. Designating a computer as "server-class hardware" implies that it is specialized for running servers on it. This often implies that it is more powerful and reliable than standard personal computers, but alternatively, large computing clusters may be composed of many relatively simple, replaceable server components.

The servers and devices in this specification typically use the one or more processors to run one or more stored "computer programs" and/or non-transitory "computer-readable media" to cause the device and/or server(s) to perform the functions recited herein. The media may include Compact Discs, DVDs, ROM, RAM, solid-state memory, or any other storage device capable of storing the one or more computer programs.

With reference to FIG. 1, shown is illustrative of a typical audio conference scenario with a remote user 101 communicating with a shared space conference room 112. The purpose of this illustration is to portray a typical scenario in which audio echo cancelation and calibration may be required. Echo canceller calibration is required in all but the simplest installations where the room transfer (meaning the acoustic relationship between the device speaker and microphone) function 201 is well understood and static in nature such as a cellphone. Otherwise, the echo canceller will require a calibration process to function optimally. For clarity purposes, a single remote user 101 is illustrated. However, it should be noted that there may be a plurality of remote users 101 connected to the conference system 106 which can be located anywhere a communication connection 105 is available. The addition of incremental remote users 101 increases the opportunity for system audio return echoes to develop and propagate through the conference call potentially creating low quality audio performance and feedback; especially for the remote users 101 who are listening and not verbally talking (muted). The size, shape, construction materials and the usage scenario of the room 112 creates situations in which the room 112 will require calibration of the echo canceller contained within the conference system 106.

The remote user 101 may utilize a laptop computer device 104 connected with audio cables 103 to a headset 102. Utilization of a headset 102 will minimize the chance of an echo signal being generated at the remote user 101 far-end. If the remote user 101 choses to use the built-in microphone and speaker of the laptop computer device 104, the opportunity for a return echo signal to be generated is significantly increased at the far end as there is minimal sound isolation between the built-in speaker and microphone. The remote user 101 can use any audio conference enabled system. The laptop computer device would typically run a UC (Unified Communications) client software, and/or hardware device.

Figure 7B:
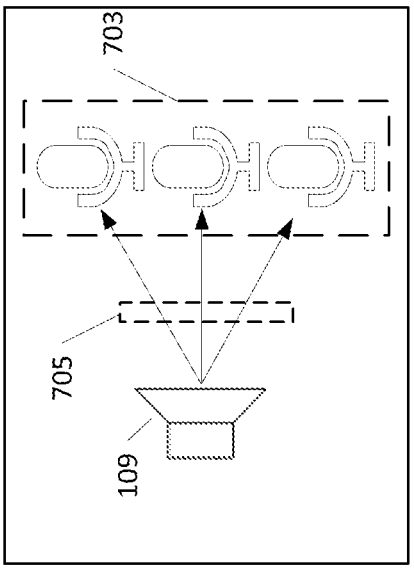
FIGS. 7a, 7b, 7c and 7d are illustrative examples of microphone to speaker echo relationships.

The conference room 112 preferably contains an audio conference enabled system 106 that is connected 110 to a speaker system 109 and a microphone system 8108. The in-room speaker system 109 for the purpose of simplicity is shown as a single speaker 109 unit, however any number of speaker units 109 is supported as illustrated in FIG. 7c. The in-room microphone system for the purpose of simplicity is shown as a single microphone 8108 unit, however any number of microphone units 8108 is supported as illustrated in FIG. 7b. The speaker system 109 and the microphone system 8108 may be installed in any number of locations and anywhere in the room 112. It should be noted that microphone 8108 and speaker 109 systems are often integrated in the same device such as tabletop devices and/or wall mounted integrated enclosures or any combination thereof and is within the scope of this disclosure.

There are notionally four participants illustrated in the room, Participant 1 107a, Participant 2 107b, Participant 3 107c and Participant 4 107d. Participant(s) and sound source (s) and desired sound sources(s) can and will be used interchangeably and in this context, mean substantially the same thing. Each participant illustrates, but is not limited to, an example of desired sound sources within a room 112. As the number of participant's 107a, 107b, 107c, and 107d increase or decrease, arrangement of the furniture 113, or noise sources such as HVAC and display devices (not shown) and external environmental noises increase or decrease the effective ambient noise floor of the room. The ambient noise floor changes can impact the effectiveness of the audio system 106 calibration process which as a result may need to use loud tones and/or pulses and may require the room be silent forcing the muting of the noise and sound sources which may not be possible.

The remote user 101 and the conference room 112 are connected via a communication connection 105. The audio conference enabled system 106, is any device and/or software combination that supports audio conference capabilities and is within the scope of this invention.

Figure 2B:
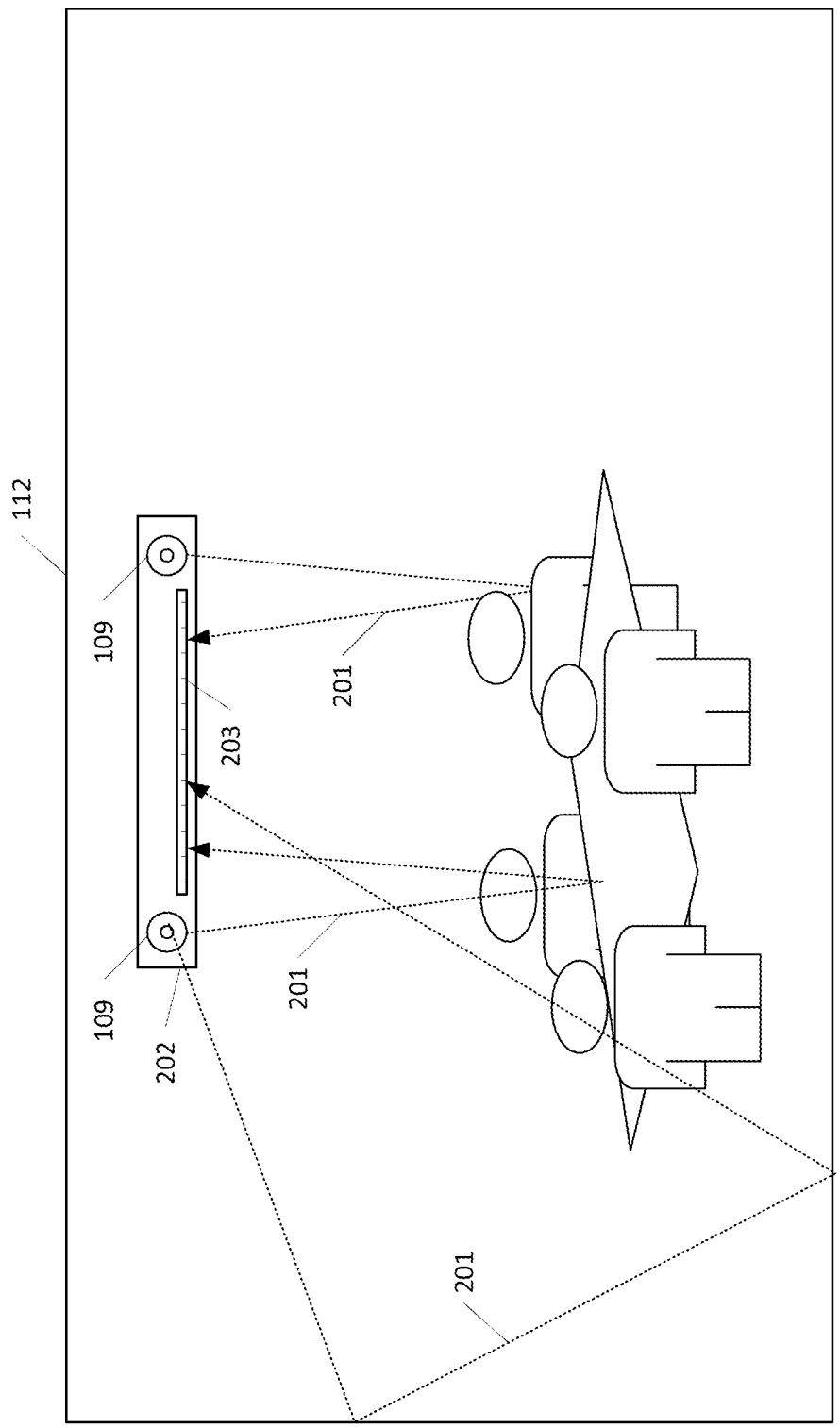
FIG. 2b is a diagrammatic illustration of echo canceler calibration signals with an integrated microphone and speaker system.

With reference to FIGS. 2a and 2b, illustrated are examples of the basic room transfer function 201 created between microphones 108 and speakers 109. FIG. 2a illustrates a discrete microphone 108 and speaker 109 installation into a shared space 112. The microphone 108 and speaker 109 are connected to an audio conference system 106 which supplies the audio processing, echo cancelation and calibrations to support an audio conference call illustrated in FIG. 1.

The room transfer function (RTF) 201 is a derived measurement that takes into account an acoustic signal traveling path at the speed of sound through the air which emanated from speaker 109 to reach the microphone 108 through all reflected paths 201 in the shared space 112. For the purpose of this disclosure RTF and reflected signals 201 are construed to mean the same thing and can be used interchangeably throughout the specification. To obtain the room transfer function 201 measurement a calibration tone is preferably required. The calibration tone is typically a type of signal used to form an impulse response measurement. An impulse is a signal with a brief and known time extent that is of sufficient amplitude to have enough signal to be evident above the ambient noise of the environment. Put another way, making the assumption that a room is a linear system, the RTF 201 is the measure of the application of a delta function to a linear system that measures the time and frequency domain distortions to the original delta function signal. The impulse response measurement is used by the audio system to calibrate the echo canceler circuit for the purpose of removing far-end return echo signals generated when the room 112 reflects back the remote participant's 101 speech output through the speakers 109 and into the microphone 108 signals. Typically, in the current art, calibration of the echo canceller occurs as a specific step during the setup procedure executed by the person installing and configuring the audio system 106 before the audio system 106 can be used for a UCC call. Such person may be an audio technician or IT specialist. Usually, the impulse signal is comprised of a tone or tones of sufficient volume and the calibration process of sufficient length that it is an extra step or function that cannot be performed during an active meeting or call session.

FIG. 2b further illustrates that the form factor or layout of the microphone and speaker 202 system does not negate the requirement to perform the echo canceler calibration function. Even though the speakers 109 and microphone array 203 are collocated in the same chassis 202 the room reflections 201 still need to be taken into account and an RTF 201 measurement completed for the echo canceller to perform properly.

With reference to FIGS. 3a, 3b, 3c, and 3d, outlined are the basic steps required to perform an audio system calibration in the current art. Notionally, we have a room occupied with four participants Participant 1 107*a*, Participant 2 107*b*, Participant 3 107*c* and Participant 4 107*d*. It can be assumed that one of the participants is knowledgeable about the requirement to perform an audio system 106 calibration and is familiar with the calibration process and may be for example a person from IT (Information Technology) and/or an acoustic technician or just a technical specialist 107*a* that is managing the process. A basic audio conference system 106 is installed in the room 112 which is connected 111 to a separate microphone 108 and connected 110 to a separate speaker 109. The participants are actively communicating 302 before the calibration process has been initiated. In FIG. 3*a* during this conversation 302 the specialist participant 107*a* activates the audio conference system 106 calibration routine 301.

FIG. 3*b* illustrates the process of calibration 301 with the calibration signal 201 bouncing (reflecting) around the room 112. It should be noted that the participants 107*a*, 107*b*, 107*c* and 107*d* are prompted to stay silent 301. This is to prevent anomalous readings during the RTF 201 measurement for the echo canceller calibration. If unwanted noise or sound sources intervene during the calibration process 301 it is likely the calibration would need to be repeated. The calibration process 301 completes as indicated in FIG. 3*c* and the conference call can be instantiated, and the room can return to normal function as illustrated in FIG. 3*d*.

It should be noted that if the room is rearranged, devices added to the walls, furnishing changed, and/or the audio conference equipment such as the speakers 109 or the microphone 108 relocated in the room there is a high likelihood that the previous calibration 301 has become invalid, and the process is required to be repeated taking the room 112 offline until the calibration is completed. Although a simple calibration process 301 has been illustrated, the complexity and time of the calibration 301 would increase with the addition of more microphone 108 and speaker 109 combinations which may require specific test and calibration equipment and specialized acoustic personnel to complete the task.

With reference to FIG. 4, illustrated is a current art (see, e.g., U.S. Pat. No. 10,499,151, entitled "System and Method for Embedding Additional Information in a Sound Mask Noise Signal," issued Dec. 3, 2019, which is hereby incorporated by reference) performing a continuous calibration using a static amplitude sound mask signal to measure the RTF 201 calibration in real-time regardless of the usage state of the room, i.e. during a conference call, or whether the room is silent, busy and even empty.

Figure 5B:
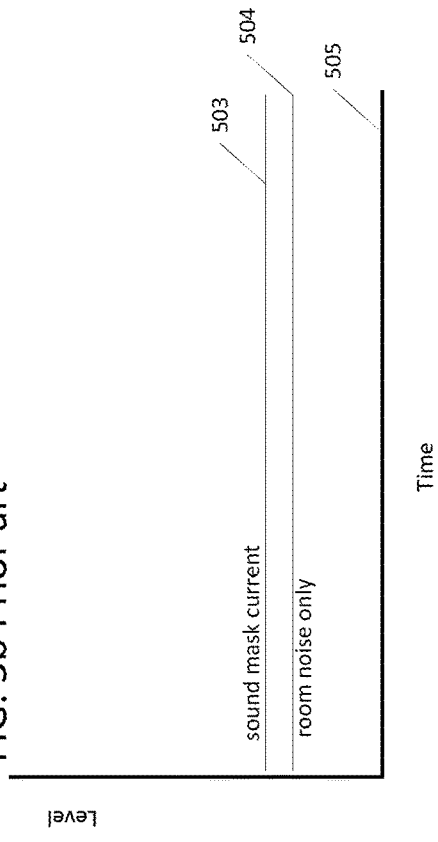
FIGS. 5a, 5b, 5c, and 5d are prior art examples of static sound mask.
Figure 5D:
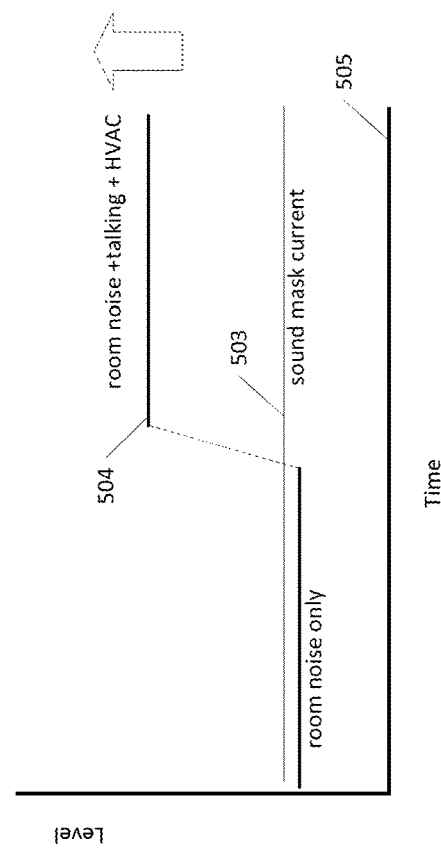
Figure 5A:
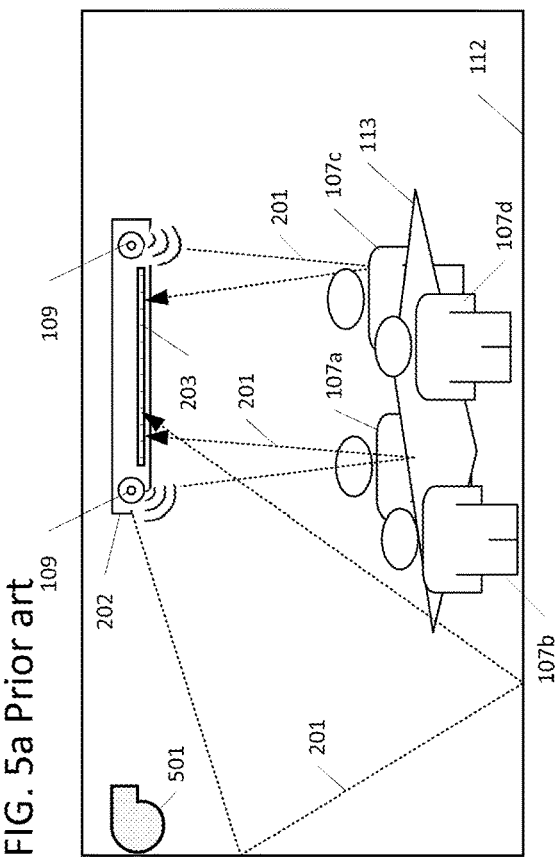

With reference to FIGS. 5*a*, 5*b*, 5*c*, and 5*d*, shown are current art illustrations showing the relationship between room 112 ambient noise 504 and the static sound mask generator 801 not adapting to the current room changes in ambient noise. FIG. 5*a* illustrates a room 112 occupied with notionally 4 participants 107*a*, 107*b*, 107*c* and 107*d* surrounding a table 113. The microphone and speaker bar 202 is outfitted with two speakers 109 and a microphone array 203. The microphone and speaker bar 202 is outputting a continuous static sound mask signal 201. The participants are silent and the room HVAC system 501 is not running. FIG. 5*b* is a graphical illustration of sound level vs time 505 in the room 112. The sound mask generator 801 signal 201 is shown at a constant level 503 and the room noise is also at a constant minimum level 504.

Figure 5C:
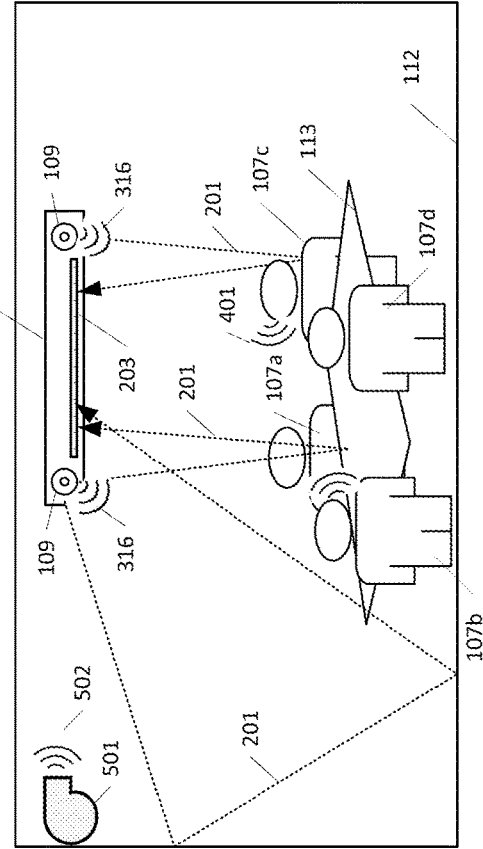

FIGS. 5*c* and 5*d* illustrate a change in ambient room noise level 504 while the static sound mask generator 801 signal (FIG. 5*d*) 503 stays consistent. The microphone and speaker system 202 is outputting a combination of signals 316 consisting of the audio conference audio content from the UC client 110 and the static sound mask generator 801 signal 201. The participant's 107*a*, 107*b*, 107*c*, and 107*d* may be speaking 401 and the undesired sound source (i.e., HVAC 501) has turned on emitting noise 502. The result is the ambient noise (FIG. 5*d*) 504 increases in the room 112 however the sound mask generator 801 signal (FIG. 5*d*) 201 remains static 503 and not adapting to the changes in the room 112 in real-time.

Figure 5E:
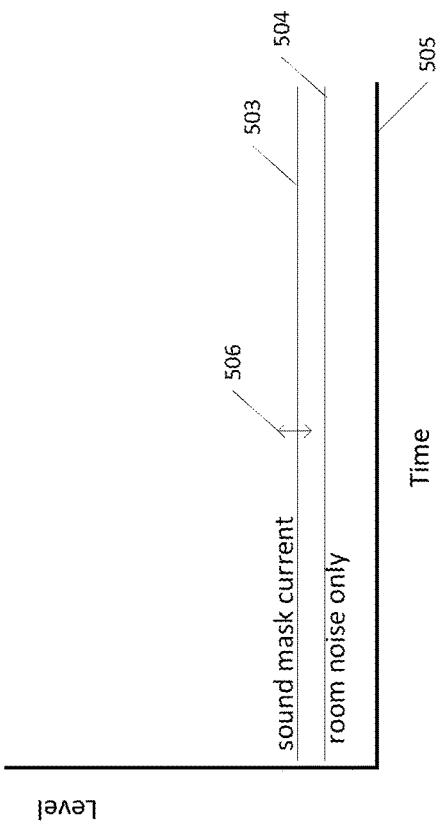
FIGS. 5e, 5f, 5g, 5h, 5i and 5j are diagrammatic and graphical illustrative examples of a preferred embodiment of the present invention.
Figure 5F:
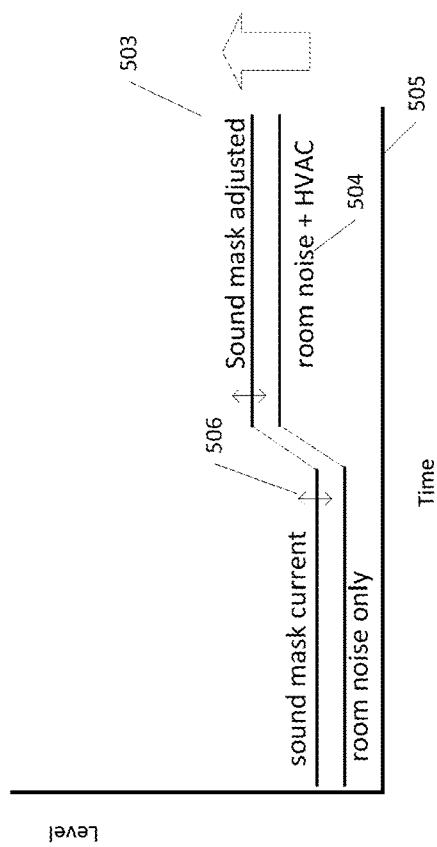
Figure 5G:
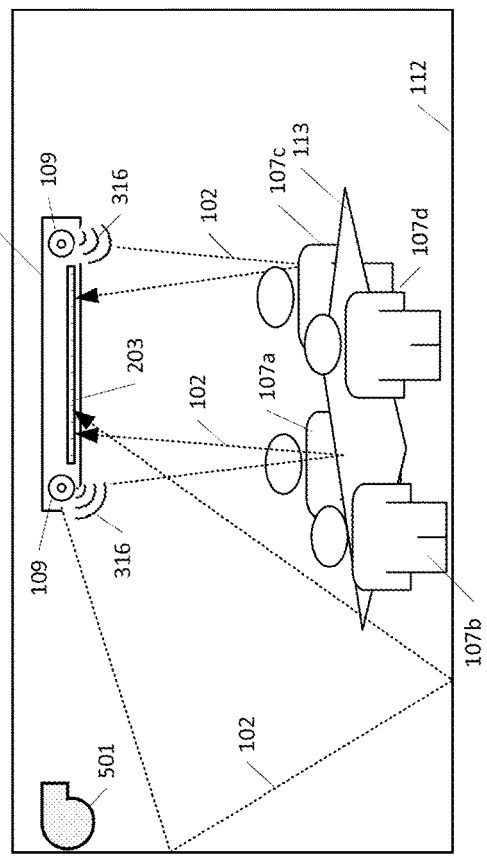
Figure 5H:
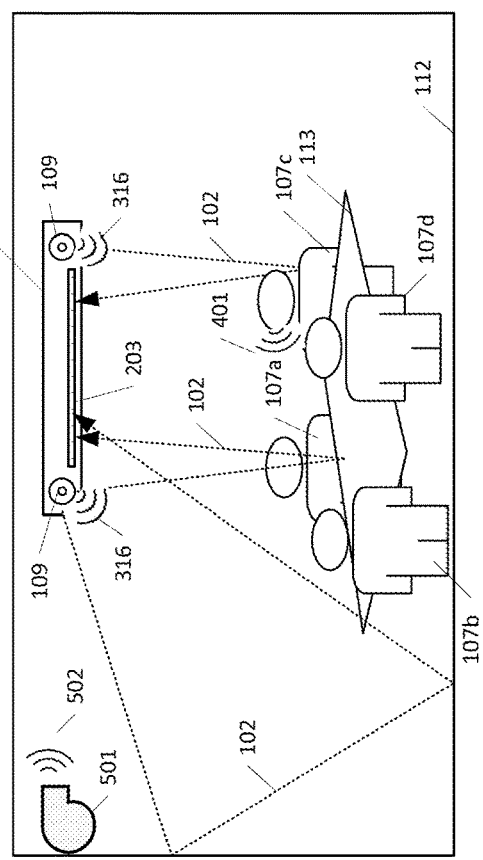
Figure 5J:
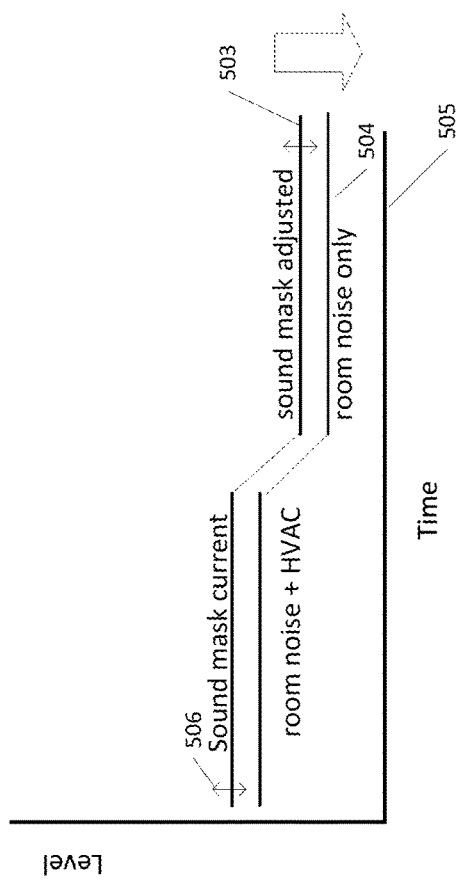
Figure 5I:
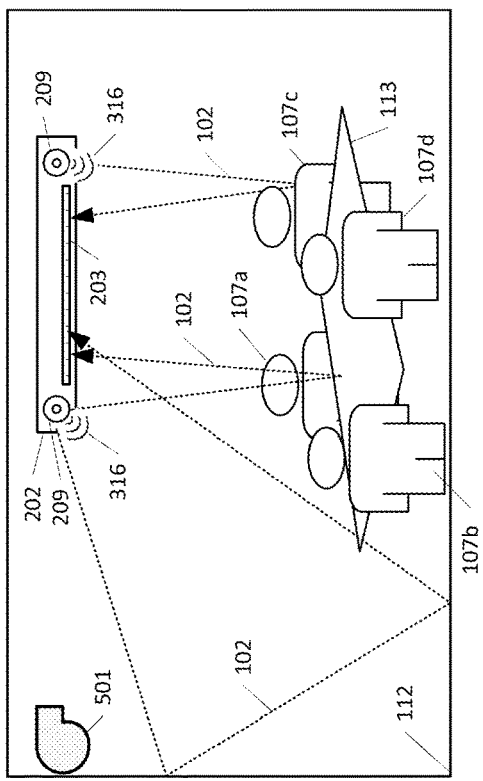

With reference to FIGS. 5*e*, 5*f*, 5*g*, 5*h*, 5*i*, and 5*j*, shown are preferred exemplary embodiments showing the relationship between room 112 ambient noise 504 and the dynamic sound mask 506 adapting to the current room situation in real-time to undesired sound sources 502. FIGS. 5*e*, 5*g*, and 5*i* contain a microphone and speaker system 202 that contains a preferred embodiment of the dynamic sound mask generator 807. As the room 112 stays quite in FIG. 5*e* the dynamic sound mask signal generator 807 level 503 is tracking to the baseline ambient noise 504 (FIG. 5*f*) of the room 112. The dynamic adjustment range of the dynamic sound mask signal 506 (FIG. 5*f*) of the dynamic sound mask signal generator 807 can be set to any offset at, above or below the measured ambient noise level 504 based on the sound mask generator 807 configuration settings.

As illustrated in FIG. 5*g*, even if participants in the room 112 start to communicate 401, the measured ambient noise 504 will increase for a short period of time but not trigger an increase in the signal level 503 of the dynamic sound mask generator 807. This is optionally accomplished by including a call status detector 809 which determines when it is desirable to monitor or ignore room noise levels and changes based on knowledge of the UC call status (idle, far-end, near-end, duplex). When the algorithm has determined the sound mask level should change, the dynamic sound mask generator 807 adjusts (as shown in FIG. 5*h*) and responds to the increase in total room noise 504 which is now the sum of the room ambient noise added to the undesired sound source noise 502 that would occur as the result of an undesired sound source such as an HVAC 501 turning on as referenced in FIG. 5*g*. The dynamic sound mask generator 807 tracks and adapts to the increase in total room noise level 504 and changes the level of the dynamic sound mask signal 503 accordingly to maintain the desired level within the range specified in configuration settings 506 relative to the total room noise 504 level in the room 112.

FIG. 5*i* illustrates a change in total room noise as the undesired noise source (HVAC) 501 has turned off lowering the total room noise to the ambient room noise level 504. As a result, room 112 goes nearly silent with all participants staying quiet and the HVAC 501 has turned off resulting in the ambient noise level 504 of the room 112 dropping considerably, and back to background level 504 as demonstrated in FIG. 5*j*. The dynamic sound mask generator 807 responds by adjusting the dynamic sound mask level 503 down to a desired range 506 relative to the current ambient noise level 504.

Figure 6A:
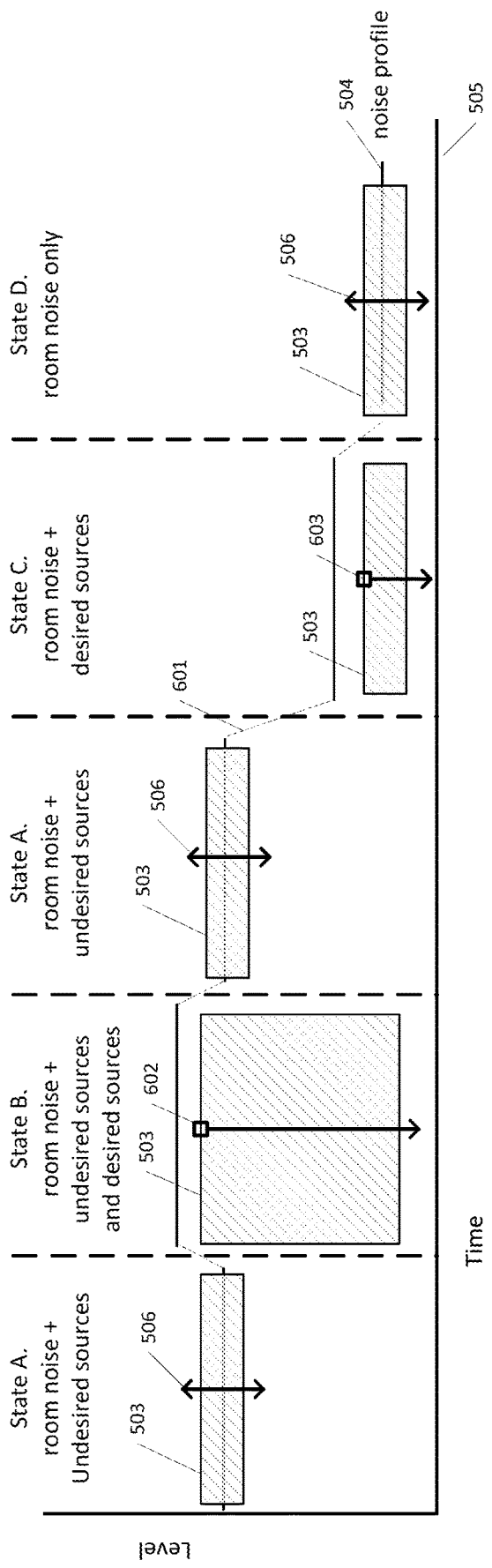

With reference to FIGS. 6*a* and 6*b*, shown are illustrative examples of how the dynamic sound mask generator 807 responds to the different room 112 sound states. The room 112 sound states are defined as follows:

State *A*=ambient room noise+undesired sound sources

State *B*=ambient room noise+undesired sound sources+desired sound sources

State C=ambient room noise+desired sound sources

State D=ambient room noise only

The room 112 sound states are determined by the audio conference system 106 based on the room noise measurements and the status of the call state detector 809 which is defined in detail in FIG. 8*d*.

FIG. 6*a* shows a sequence of typical states for an audio conference room. In State A, the dynamic sound mask generator 807 will recognize that the total room noise 504 has increased as a result of an undesired sound source 314 becoming active. As a result, the dynamic sound mask generator 807 has the ability to adjust 506 the dynamic sound mask signal 503 up or down to a configurable offset value based on the measured total room noise 504. It is important to note that it is preferable to adjust the dynamic sound mask signal 503 to changes in ambient noise and/or additional undesired sound sources 501. This is to maintain an acceptable level of background noise to not impede in-room 112 conversations and to minimize the obviousness of the dynamic sound mask signal 503 (keep the dynamic sound mask signal 503 from drawing attention to itself). If talkers (desired sound sources) start to engage in conversation, there will potentially be an increase in the total room noise 504 as shown in State B. It is important that the dynamic sound mask generator 807 recognizes State B and does not adjust the dynamic sound mask signal 503 upwards to compensate for the increase in total room noise 504 if that is the desired configuration. Instead, the upper adjustment is fixed 602 to a preconfigured level and/or to the upper limit of State A. However, the dynamic sound mask signal 503 can still be adjusted 602 down or lower in level as allowed for in the configuration settings as defined by the operating window of the algorithm.

When the room 112 is in State C the same constraints apply as State B. The upper dynamic sound mask signal 503 adjustment 603 is limited to not track the increase in total room noise 504. As previously stated, the dynamic sound mask signal 503 is able to be adjust down 603 in level or back up to the preconfigured and/or maximum level configured for State A. State D allows for both up and down adjustments 506 based on the changes in ambient noise level and the configuration offset settings. The dynamic sound mask generator 807 will respond uniquely to each individual room 112 sound state as illustrated in FIG. 6*a*.

FIG. 6*b* is an expanded view of the sound level vs time graphical illustration 505. The room noise 504 is shown as a line and the sound mask signal 503 can have an adjustment range 506 at any offset value at, above, or below the ambient noise level 504. The sound mask signal 503 can be adjusted 601 between settings for example by step size, rate changes, and to a constant offset value as further exemplified in FIGS. 11*a*, 11*b*, 11*c*, 11*d*, 11*e*, 11*f*, 11*g*, and 11*h*.

Figure 7D:
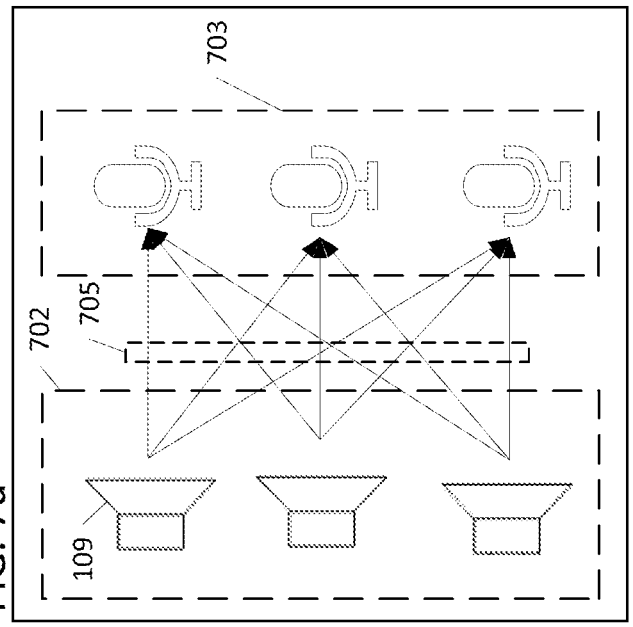
Figure 7A:
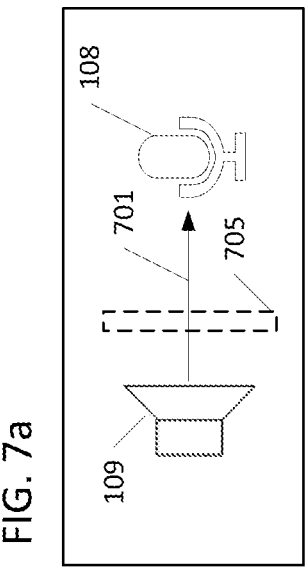
Figure 7C:
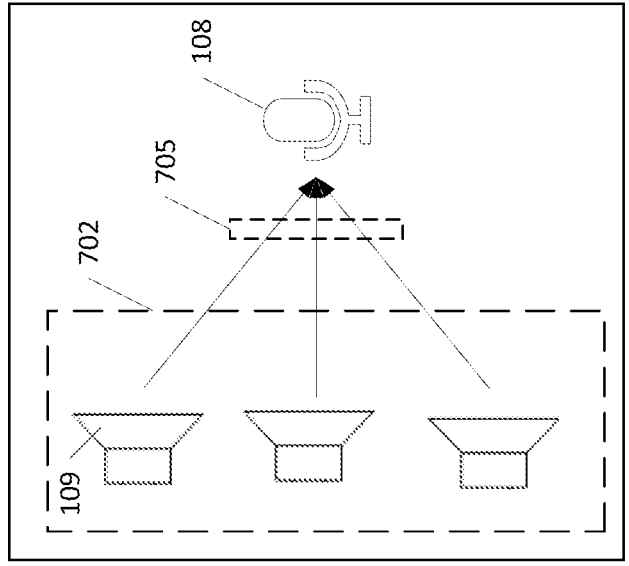

With reference to FIGS. 7*a*, 7*b*, 7*c*, and 7*d*, illustrated are the complex echo signal relationships 701, 704, 705, 706 that are formed between a microphone system 108, 703 and the speaker system 109, 702. Any number of microphones 108, 703 and speaker 109, 702 combinations are supported within preferred embodiments of the invention. FIG. 7*a* illustrates a single speaker 109 and single microphone 108 combination. Although one audio signal path 701 is shown for the purpose of illustration it should be noted that there is a direct path signal 701 and a plurality reflected paths signals 705 for each microphone 108 and speaker 109 combination. It is this plurality of reflected path signals 705 which form the RTF 201 that make dealing with return echo signals problematic. Echo canceler systems should take into account the complex return echo signal received and reduce it below the desired signal which for example is a participants 107*a*, 107*b*, 107*c*, and 107*d* speaking in the room as much as possible. FIGS. 7*b*, 7*c*, and 7*d* show the more complex echo signal relationships that develop as more microphones 108 and speakers 109 are added to the conference room 112. The echo canceller calibration process is the most effective way of characterizing the room transfer function 201, and the ability to measure and adjust the echo canceller in real-time.

There have been numerous attempts to deal with this complex problem with mixed success due to limitations imposed by either a fully manual calibration process or a onetime automatic calibration which fails to deal with the dynamic situations typically required of meeting and calibrating a room 112. Such methods have attempted to apply a static calibration to a dynamically changing environment with limited success.

With reference to FIG. 8*a*, illustrated is a current art sound mask generator 801 which adds the sound mask signal 800 at a static level to the input speaker signal 110 resulting in the final speaker signal 802. The generator requires no additional inputs or controls as it provides a fixed level sound mask signal. Performance of the primary echo canceller 808 depends on the room acoustics and how well the echo canceller has automatically calibrated to the room using the sound mask. A critical factor determining this performance is the sound mask level relative to the ambient noise 809 level as a higher sound mask level results in faster and better calibration. Another factor which must be considered from a product and user experience perspective is overall loudness of the sound mask and how noticeable it is relative to the room 112. Many business offices have white noise generators 810 to help drown out background noises in cubicle environments or open spaces. Typically, these white noise generators are installed above ceiling tiles throughout a building. However, depending on eventual office and conference room layouts, the impact of these white noise generators 810 can vary with some rooms being noisy (>45 dB SPL) and others quieter (~30 dB SPL). In quieter areas, the effect of the sound mask becomes very noticeable and distracting.

The objective of the invention is to dynamically adjust the level of the sound mask signal 800 to match the ambient level 504 in the area within a certain tolerance or window which may include time. Utilizing parameters, the method will determine when noise levels should be sampled and if the sound mask signal 800 should be increased or decreased by a determined amount. The algorithm may further specify a fixed or variable step size when changing the sound level, a fixed or variable sample rate when monitoring and adjusting the level, or any permutation of both parameters. This includes the following: fixed step sample rate and fixed step level adjustment, fixed step sample rate and variable step level adjustment, variable step sample rate and fixed step level adjustment, variable step sample rate and variable step level adjustment. In practice, some combinations prove more difficult than others in efficiently adapting to and achieving the desired state. Nonetheless, these cases are covered as part of the invention.

With reference to FIG. 8*b*, illustrated is an embodiment of dynamic sound mask generator 807 of the disclosed invention. One embodiment of a dynamic sound mask generator 807, as shown in FIG. 8*b*, monitors raw microphone signals 803 over time to determine the ambient sound level. As the goal may be to maintain a sound mask level slightly higher than the ambient noise level, the method requires periodically reducing the sound mask 800 level enough to measure the residual noise level attributable to the undesired sound sources 502. The sampling rate and adjustment levels are configured as previously described.

With reference to FIG. 8c, illustrated is another embodiment of a dynamic sound mask generator 807. Dynamic sound mask generator 807 further utilizes echo cancelled microphone signal 111 as input, potentially in conjunction with the raw microphone signal 803, to control the sound mask level. This echo cancelled signal 111 may be an individual microphone signal, a composite signal of a microphone array, a subset of individual microphones in an array, or a smoothed average of any or all of these. An advantage to this embodiment is the sound mask, being part of the speaker signal during calibration and playback, is fully removed by the echo cancellation process 805 allowing the residual ambient noise signal to remain. This allows a simplification in the algorithm whereby the sound mask signal 800 level need not be temporarily reduced to determine the ambient room noise 502 level and monitoring the difference between the raw microphone 803 level and echo cancelled noise 111 level may prove sufficient in determining sound mask 800 level contribution to overall room noise level 504.

With reference to FIG. 8d, shown is a preferred embodiment of the invention which utilizes a call state detector 811 as an additional input 812 to dynamic sound mask generator 807. The call state detector 811 uses widely known methods for determining which of four possible states a conference call is in (idle, far-end only, near-end only, or duplex) based on the speaker signal 110 and echo cancelled microphone signal 111. This added input 812 assists dynamic sound mask generator 807 in determining appropriate times to monitor or ignore room noise levels. For example, monitoring and adjusting activities may be limited to idle states when there is no speaker or in-room conversation detected. Other identified, but not wholly encompassing, uses could be to monitor overall room sound levels during calls (near-end, far-end, or duplex states) and appropriately scale back or remove the sound mask signal 800 level when room levels are very high.

With reference to FIG. 9, shown is an example time domain waveform of the sound mask signal 800 with transient noise spikes 901 which occurred during the capture. Due to continual, real-time calibration requirements, the inventive algorithm must be robust in handling these disturbances as well as situations where the meeting space is actively used for conference calls.

With reference to FIG. 10a, shown is a logarithmic spectral plot in decibels full scale (dB fs) of the generated sound mask signal 800. The signal is broad band to provide an accurate calculation of room transfer function 201 which characterizes how a room will respond to different component frequencies during a conference call. Knowing room transfer function 201 allows an accurate estimation of the expected echo response due to the rooms acoustic performance when voices of far-end participants on a conference call are played through the system's speakers 109. This estimation 806 is used to remove the speaker signal from the raw microphone signal 803 during the echo cancellation process 805. Poor echo cancellation results in a portion of the input speaker signal 110 being returned to far-end participants as part of the output microphone signal 111 leading to a disruptive experience and, in extreme cases, acoustic feedback 'howl'.

Figure 10B:
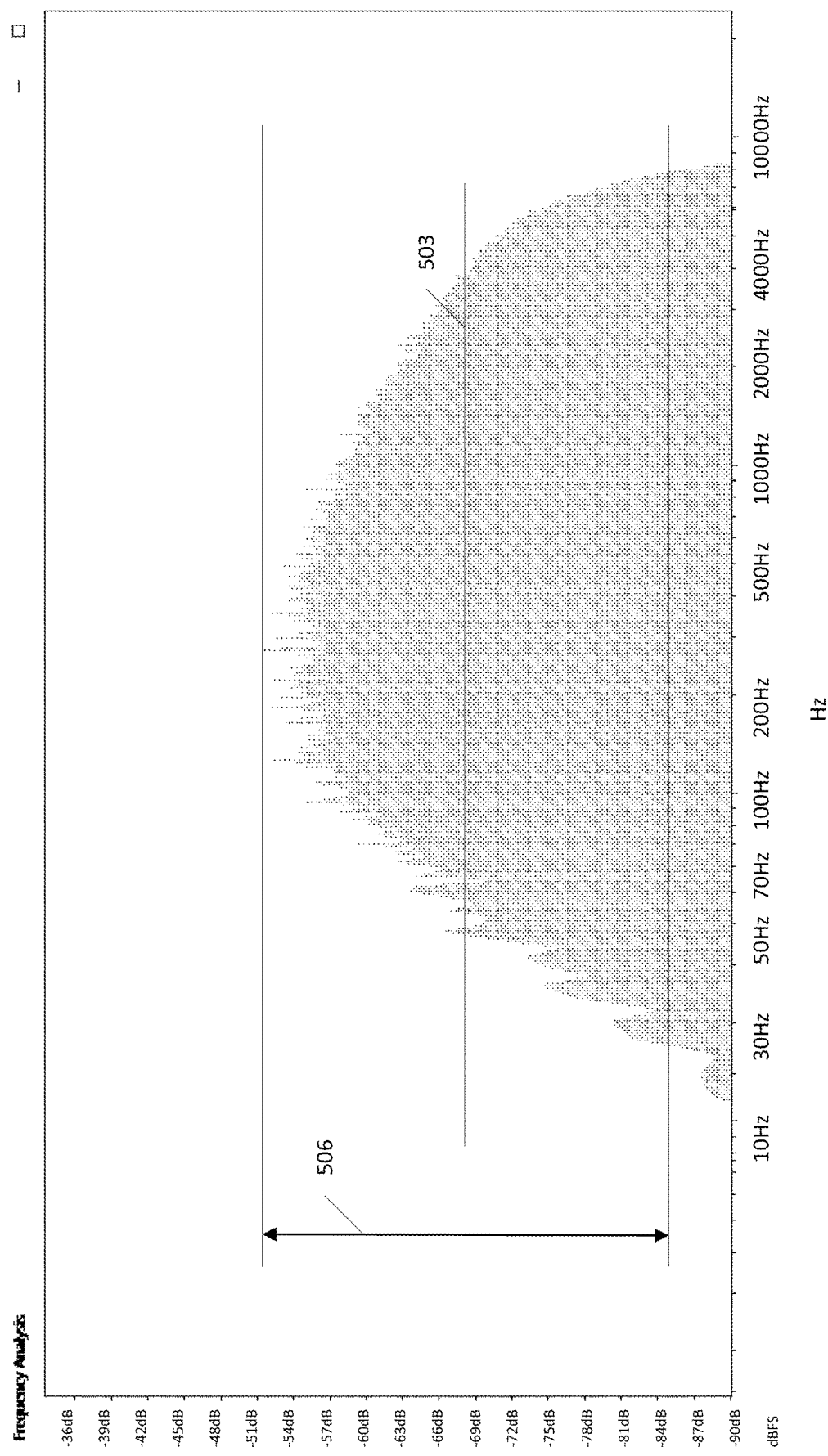
FIG. 10b is a graphical capture of the sound mask signal amplitude vs frequency outlining the dynamic amplitude adjustment window.

With reference to FIG. 10b, shown is a logarithmic spectral plot in decibels full scale (dB FS) demonstrating the goal of the invention and how the overall amplitude/level 503 of the sound mask signal is changed but not the spectral content. The algorithm determines the allowable range of levels 506 based on chosen parameters and not limited to the range as pictured.

With reference to FIGS. 11a, 11b, 11c, and 11d, illustrated are examples and important aspects of the algorithm's rate change mechanism. FIG. 11 11a shows a steady-state sound mask signal where the full-scale 1100 and reduced-scale 1101 periods are shown with the reduction level 1103. The overall change rate period 1102 is a combination of the full-scale 1100 and reduced-scale 1101 periods and not changing in this example. FIG. 11b demonstrates a variable rate change where the full-scale period 1100 is extended by an amount determine by the algorithm parameters and system inputs resulting in a longer full-scale period 1104 and overall change rate period 1105. Transition to a longer change period may be desirable for many reasons. A couple of examples might be: the algorithm has detected the ambient noise level has stabilized and does not require frequent adjustments or the algorithm may utilize a time-based method where longer adjustment periods are sufficient during overnight hours. FIG. 11c provides a further example of the change rate period being extended then returned to the previous period due to conditions detected by the inventive algorithm. This could be the case where the ambient noise level decreases briefly then returns to a less consistent state requiring frequent monitoring and changes. Another aspect of the invention is the ability to vary the reduced-scale period 1101 as exemplified in FIG. 11d where every fifth reduced-scale sample has an extended period 1106. This aspect of the invention might allow a larger set of noise samples to be gathered for more in-depth analysis on a less frequent 1107 but still periodic or even random basis.

With reference to FIGS. 11e, 11f, 11g, and 11h, demonstrated are examples of the algorithm's Step Change mechanism. When it is determined the sound mask 800 level requires adjustment, the algorithm may utilize a fixed-step or variable-step adjustment. FIG. 11e shows a simple, linear fixed-step adjustment 1109 which may be determined by a step size or alternatively using a desired sloped 1108 to calculate the next level. FIG. 11f is an example utilizing a more aggressive fixed-step adjustment 1109 with a larger slope 1110. In FIG. 11g, the level is being adjusted using a variable-step adjustment potentially where a large overall adjustment is required. Initial level changes are made with large step sizes 1111 which are then reduced 1112 over time as the algorithm nears the desired level to minimize error and avoid overshooting the adjustment. Instead of a linear adjustment, the algorithm implements changes similar to an exponential curve 1113. FIG. 11h is a final example demonstrating the most complex scenario utilizing a variable-step change in combination with a variable-rate change where the initial rate change period 1102 is extended 1105 as the desired level is reached. This combination results in a more complex adjustment curve 1114 that provides quick convergence to the desired level with less risk of error and overshoot.

It should be noted for all examples that the adjustment mechanism works in a similar manner when adjusting levels upward and could implement one mechanism for the downward adjustment (ex. fixed-step, fixed-rate) while a different mechanism may be employed for the upward adjustment (ex. variable-step, variable rate).

With reference to FIG. 12a, shown is a capture of a downward adjustment using a fixed-step, fixed-rate adjustment following a linear slope 902 to reach a desired level above the ambient noise level 504. The algorithm demonstrates a steady adjustment until the reduced-level samples reach the new noise level 504 in the presence of noise transients 901 evident in the capture. FIG. 12b is a capture of the algorithm operating in a steady-state during fixed-rate monitoring while FIG. 12c shows a capture of the noise level 504 undergoing a significant increase 903 to a higher level 904. The algorithm is shown adjusting the sound mask level upward using the same fixed-step, fixed-rate mechanism in reaction to the change 903 in ambient noise level 504 to attain the desired sound mask level roughly 2 dB SPL above the new ambient level 904.

With reference to FIG. 13, shown is a functional diagram of the dynamic sound mask generator 807. The invention utilizes the raw and/or echo cancelled microphone signal(s) 111, 803 as input to the noise accumulator/monitor (NAM) 1301 and according to specified parameters, determines when to sample and accumulate the ambient noise signal or allow the sound mask 800 to continue running at full-scale 1100. Based on the rate change criteria, the sound mask signal generator (SMSG) 1300 is signaled 1302 to output a reduced-scale signal 1100, 1101 which is combined with the incoming speaker signal 110 resulting in the output speaker signal 802 so the NAM can re-sample the ambient noise level 504. The new sound mask level 1100, 1101 is determined by the fixed-step or variable-step adjustment mechanism as previously detailed and further explained by the algorithm flowchart.

With reference to FIGS. 14a and 14b, shown is an embodiment of a method for dynamic sound mask adjustment. Embodiments of such dynamic sound mask adjustment methods assume a sound mask has been generated and dynamically adjust the sound mask level based on real-time ambient noise parameters. Embodiments are performed while maintaining echo canceller calibration performance. Embodiments of the method may be executed by embodiments of the dynamic sound mask generator and, more particularly, by embodiment of the noise accumulator/monitor 1301 logic. An initialization block S100 is used to configure parameters in the algorithm. The full-scale 1100 and reduced-scale 1101 sound mask signal periods are used to control the full-scale and reduced-scale sound mask signal output time. The method can function with any period (even up to 30 minutes if desired) but in practice, shorter time periods allow for quicker adaptation as ambient levels change. Based on typical conference room environments, an initial period $T_{full}^{(0)}$, e.g., of three (3) minutes, and $T_{reduced}^{(0)}$, e.g., of one (1) minute, are used as base values corresponding to the lowest sound mask level adjustment iteration rate. The adaptive step size for iteration rate adjustment, $0<v<1$, is used to adaptively adjust the iteration rate for the sound mask level adjustment. Typical value is small, e.g., 0.05. The full-scale sound mask signal period minimum limit $T_{full\_min}$ and reduced-scale sound mask signal period minimum limit $T_{reduced\_min}$ are the period limits used to clip iteration rate to their high limits. The reduced sound mask level scale factor, $0<\alpha<1$, is used to gather reduced sound mask signal and ambient noise power. Typically, $\alpha$ is chosen between 0.7 to 0.9. The power ratio threshold upper limit $TH_{upperLimit}$ and lower limit $TH_{lowerLimit}$ are used as hysteresis thresholds to adjust the sound mask level, $0<TH_{lowerLimit}<TH_{upperLimit}$. While the method allows any upper limit to be specified to account for very noisy environments, testing in typical conference room environments led to a choice of $TH_{lowerLimit}=1$ dB and ⏑ for initial default parameters but ranges as high as 6 dB or 12 dB could be $TH_{upperLimit}=3$ dB. Adaptive step size for sound mask level adjustment, $0<\mu<1$, is used to adaptively adjust the sound mask level each iteration. Typical value is small, e.g., 0.05. The sound mask level limits, $SM_{max}$ and $SM_{min}$ are the limits used to clip the sound mask level to their high limit and low limit.

Step S102 initializes the main loop counter/index ahead of gathering and averaging new signals.

Step S104 determines a UC call state or status. This can be accomplished with multiple, widely known methods and is not critical to the invention; only the determination of which one of four states the call is in: idle, far-end only, near-end only, and duplex.

In S106, the algorithm uses the UC call state output of S104 to determine if it is allowed to make adjustments to the sound mask level. In the case where no adjustments are allowed, control is returned to S104 for the next call state check. When adjustments are allowed, control flows to S110.

The process gathers $P_f^{(i)}$ S110, the superposition of full-scale sound mask signal power $P_{sm}^{(i)}$ and ambient noise power $P_{ambient}^{(i)}$ averaged over a period of time $T_{full}^{(i)}$, which is the full-scale full sound mask signal power measured while full sound mask level $SM_{level}^{(i)}$ is applied to the system. As shown, this is $P_f^{(i)}=P_{sm}^{(i)}+P_{ambient}^{(i)}$.

With continued reference to FIG. 14a, an embodiment of the dynamic sound mask adjustment gathers $P_r^{(i)}$ S120, the superposition of reduced-scale sound mask signal power $\alpha^2 P_{sm}^{(i)}$ and ambient noise power $P_{ambient}^{(i)}$ averaged over a period of time $T_{reduced}^{(i)}$, which is the reduced-scale sound mask signal power measured while reduced-sound mask level $\alpha SM_{level}^{(i)}$ is applied to the system. As shown, this is $P_r^{(i)}=\alpha^2 P_{sm}^{(i)}+P_{ambient}^{(i)}$.

The dynamic sound mask process estimates sound mask signal power $P_{sm}^{(i)}$ S130 from $P_f^{(i)}$, gathered as shown in block S110, and $P_r^{(i)}$, gathered as shown in block S120. As shown, $P_{sm}^{(i)}=(P_f^{(i)}-P_r^{(i)})/(1-\alpha)$.

The dynamic sound mask process estimates ambient noise power $P_{ambient}^{(i)}$ S140 from $P_f^{(i)}$, gathered as shown in block S110, $P_r^{(i)}$, gathered as shown in block S120, and $P_{sm}^{(i)}$, estimated as shown in block S130. As shown, $P_{ambient}^{(i)}=\frac{1}{2}[P_f^{(i)}+P_r^{(i)}-(1+\alpha^2)P_{sm}^{(i)}]$.

Embodiments calculate power ratio $R_{f\_amb}^{(i)}$ S150 between $P_f^{(i)}$, gathered as shown in block S110, and $P_{ambient}^{(i)}$ estimated as shown in block S140.

With reference now to FIG. 14b, embodiments determine, block S160, if the power ratio $R_{f\_amb}^{(i)}$, calculated per block S150, is greater than the upper threshold limit $TH_{upperLimit}$. If the power ratio $R_{f\_amb}^{(i)}$ is higher than the upper threshold limit $TH_{upperLimit}$, the dynamic sound mask process calculates a sound mask power decrease adjustment $\Delta SM_{decrease}^{(i)}$ S170. As shown, $\Delta SM_{decrease}^{(i)}=\mu(R_{f\_amb}^{(i)}-TH_{upperLimit})$. Since the sound mask signal power is higher than the upper threshold limit, embodiments reduce the sound mask level $SM_{level}^{(i+1)}$ S180 for a next iteration by the calculated adjustment $\Delta SM_{decrease}^{(i)}$, calculated in block S170, from current sound mask level $SM_{level}^{(i)}$ ($SM_{level}^{(i+1)}=SM_{level}^{(i)}-\Delta SM_{decrease}^{(i)}$). The process also limits or clips the sound mask level $SM_{level}^{(i+1)}$ S190 to its minimum limit $SM_{min}$. ($SM_{level}^{(i+1)}=\max(SM_{level}^{(i+1)}, SM_{min})$. The dynamic sound mask generation and adjustment process also calculates the update iteration rate adjustment $\Delta T^{(i)}$ S200 if the power ratio $R_{f\_amb}^{(i)}$ is higher than the upper threshold limit $TH_{upperLimit}$. As shown, this is $\Delta T^{(i)}=v(R_{f\_amb}^{(i)}-TH_{upperLimit})$.

If the dynamic sound mask adjustment method determines, block S160 that the power ratio is not greater than the higher threshold limit, it then determines, block S210, if the power ratio $R_{f\_amb}^{(i)}$ than the lower threshold limit $TH_{lowerLimit}$. If the power ratio $R_{f\_amb}^{(i)}$ is lower than the lower threshold limit $TH_{lowerLimit}$, embodiments calculate the sound mask power increase adjustment $\Delta SM_{increase}^{(i)}$ S220 ($\Delta SM_{increase}^{(i)} = \mu(TH_{upperLimit} - R_{f\_amb}^{(i)})$). Since the sound mask is too low, embodiments increase the sound mask level $SM_{level}^{(i+1)}$ S230 for next iteration by the calculated adjustment $\Delta SM_{increase}^{(i)}$, as shown in S220, from current sound mask level $\Delta SM_{level}^{(i)}$ ($SM_{level}^{(i+1)} = SM_{level}^{(i)} + \Delta SM_{increase}^{(i)}$), and clips the sound mask level $SM_{level}^{(i+1)}$ S240 to its maximum limit $SM_{max}((SM_{level}^{(i+1)} = \min((SM_{level}^{(i+1)}, SM_{max}))$. Embodiments also calculate the update iteration rate adjustment $\Delta T^{(i)}$ S250 if the power ratio $R_{f\_amb}^{(i)}$ is lower than the lower threshold limit $TH_{lowerLimit}$ ($\Delta T^{(i)} = \nu(TH_{lowerLimit} - R_{f\_amb}^{(i)})$).

With continued reference to FIG. 14b, after adjusting the sound mask level, per blocks S170 to S200 or S220 to S250, the dynamic sound mask adjustment method adjusts the iteration update rates S260 for full-scale $T_{full}^{(i+1)}$ and reduced-scale $T_{reduced}^{(i+1)}$ for the next iteration by the calculated adjustment $\Delta T^{(i)}$ (either as shown in block S200 or block S250) from their base values, $T_{full}^{(0)}$ and $T_{reduced}^{(0)}$, respectively ($T_{full}^{(i+1)} = T_{full}^{(0)} - \Delta T^{(i)}$ and $T_{reduced}^{(i+1)} = T_{reduced}^{(0)} - \Delta T^{(i)}$). Embodiments also clip the iteration update rates $T_{full}^{(i+1)}$ $T_{reduced}^{(i+1)}$ S270 to their minimum limits, $T_{full\_min}$ and $T_{reduced\_min}$, respectively ($T_{full}^{(i+1)} = \max(T_{full}^{(i+1)}, T_{full\_min})$ and $T_{reduced}^{(i+1)} = \max(T_{reduced}^{(i+1)}, T_{reduced\_min})$).

If the sound mask is determined to be within the hysteresis range (e.g., the dynamic sound mask generation and adjustment method determines $R_{f\_amb}^{(i)}$ is less than $TH_{upperLimit}$, block S160, and greater than $TH_{lowerLimit}$), then the sound mask level and iteration rates do not need to be adjusted. Embodiments may iterate, block S280, values as follows: $SM_{level}^{(i+1)} = SM_{level}^{(i)}$, $T_{full}^{(i+1)} = T_{full}^{(0)}$, and $T_{reduced}^{(i+1)} = T_{reduced}^{(0)}$. After completing the iteration (blocks S270 or S280), the dynamic sound mask generation and adjustment method may start a next iteration loop S290 (setting i=i+1) and return to block S104 (as shown in FIG. 14a).

The embodiments described in this application have been presented with respect to use in one or more conference rooms preferably with local and remote multi users. However, the present invention may also find applicability in other environments such as:

Commercial transit passenger and crew cabins such as, but not limited to, aircraft, busses, trains and boats. All of these commercial applications can be outfitted with microphones and speakers which can benefit from consistent microphone audio signal quality with minimal echo signal conditions which can vary from moderate to considerable;

Private transportation such as cars, truck, and mini vans, where command and control applications and voice communication applications are becoming more prominent;

Industrial applications such as manufacturing floors, warehouses, hospitals, and retail outlets to allow for audio monitoring and to facilitate employee communications without having to use specific portable devices; and Drive through windows and similar applications, where ambient sounds levels can be quite high and variable, can be controlled to consistent levels within the scope of the invention. Also, the processing described above may be carried out in one or more devices, one or more servers, cloud servers, etc.

The individual components shown in outline or designated by blocks in the attached Drawings are all well-known in the electronic processing arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for dynamic sound mask adjustment wherein the sound mask is used for obtaining an impulse response measurement that adjusts a generated sound mask dynamically based on real-time ambient noise parameters, while maintaining echo canceller calibration performance, the method comprising:

gathering a superposition of a full-scale sound mask signal power and an ambient noise power averaged over a period of time, wherein the full-scale sound mask signal power is a maximum signal power of the sound mask;

gathering a superposition of a reduced-scale sound mask signal power and the ambient noise power averaged over a period of time, wherein the reduced-scale sound mask signal power is a signal power of the sound mask reduced from the maximum signal power of the sound mask by application of a sound mask level scale factor;

estimating a sound mask signal power from the superposition of the full-scale sound mask signal power and the ambient noise power and the superposition of the reduced-scale sound mask signal power and the ambient noise power;

estimating an ambient noise power from the superposition of the full-scale sound mask signal power and the ambient noise power, the superposition of the reduced-scale sound mask signal power and the ambient noise power, and the estimated sound mask signal power;

calculating a power ratio between the superposition of the full-scale sound mask signal power and the ambient noise power and the estimated ambient noise power;

determining whether the power ratio is in a hysteresis range;

if the sound mask is not in the hysteresis range, adjusting current sound mask power level and iteration update rate; and if the sound mask is in the hysteresis range, maintaining the current sound mask power level and iteration update rate.

2. The method of claim 1 further comprising initializing a main loop counter ahead of gathering and averaging new signals.

3. The method of claim 1 further comprising configuring parameters including a full-scale sound mask signal period, a reduced-scale sound mask signal period, an adaptive step size for iteration rate adjustment, a full-scale sound mask signal period minimum, a reduced-scale sound mask signal period minimum, the sound mask level scale factor, a power ratio threshold upper limit, a power ratio threshold lower limit, a sound mask maximum level limit, and a sound mask minimum level limit, wherein the full-scale sound mask signal period is a period during which the full-scale sound mask signal power is applied, the reduced-scale sound mask signal period is a period during which the reduced-scale sound mask signal power is applied, the full-scale sound mask signal period minimum is a minimum period of the full-scale sound mask signal period, and the reduced-scale sound mask signal period minimum is a minimum period of the reduced-scale sound mask signal period.

4. The method of claim 3 wherein the full-scale sound mask signal period is set to three (3) minutes.

5. The method of claim 3 wherein the reduced-scale sound mask signal period is set to one (1) minute.

6. The method of claim 3 wherein the adaptive step size for iteration rate adjustment is set to a value between 0 and 1.

7. The method of claim 3 wherein the power ratio threshold lower limit is greater than 0 and the power ratio threshold upper limit is greater than the power ratio threshold lower limit.

8. The method of claim 7 wherein the power ratio threshold upper limit equals 3 dB and the power ratio threshold lower limit equals 1 dB.

9. The method of claim 3 wherein the adaptive step size for sound mask level adjustment is used to adaptively adjust the sound mask level each iteration of the method.

10. The method of claim 9 wherein the adaptive step size for sound mask level adjustment is between 0 and 1.

11. The method of claim 1 wherein the adjusting the current sound mask power level and iteration update rate comprises:
calculating a sound mask power adjustment;
adjusting the sound mask power by the calculated sound mask power adjustment;
limiting the sound mask power level;
calculating an update iteration rate adjustment;
adjusting an iteration update rate; and
clipping the iteration update rate to a maximum rate.

12. The method of claim 11 wherein the determining whether the power ratio is in the hysteresis range includes determining whether the power ratio is greater than a power ratio threshold upper limit, and wherein if the power ratio is greater than the power ratio threshold upper limit,
the calculating the sound mask power adjustment calculates a sound mask power decrease;
the adjusting the sound mask power decreases the sound mask power by the calculated sound mask power adjustment;
the limiting the sound mask power level sets the sound mask power to the greater of the decreased sound mask power and a sound mask minimum level limit; and
the calculating the updated iteration rate adjustment sets the iteration rate adjustment to an adaptive step size multiplied by result of subtracting the power ratio threshold from the power ratio.

13. The method of claim 11 wherein determining whether the power ratio is in the hysteresis range includes determining whether the power ratio is less than a power ratio threshold lower limit, and wherein if the power ratio is less than the power ratio threshold lower limit,
the calculating the sound mask power adjustment calculates a sound mask power increase;
the adjusting the sound mask power increases the sound mask power by the calculated sound mask power adjustment;
the limiting the sound mask power level sets the sound mask power to the lesser of the increased sound mask power and a sound mask maximum level limit; and
the calculating the updated iteration rate adjustment sets the iteration rate adjustment to an adaptive step size multiplied by result of subtracting the power ratio from the power ratio threshold.

14. The method of claim 1 wherein the sound mask level scale factor is set to a value between 0 and 1.

15. The method of claim 1 further comprising determining a unified communication (UC) call state.

16. The method of claim 15 further comprising determining whether to make sound mask level adjustments based on the determined UC call state.

17. The method of claim 15 wherein the UC call state is chosen from a list consisting of idle, far-end only, near-end only, and duplex.

18. A system for dynamic sound mask adjustment wherein the sound mask is used for obtaining an impulse response measurement that adjusts a generated sound mask dynamically based on real-time ambient noise parameters, while maintaining echo canceller calibration performance, the system comprising:
a dynamic sound mask generator that comprises a noise accumulator and monitor that includes a processor and a memory including instructions executed by the processor for:
gathering a superposition of a full-scale sound mask signal power and an ambient noise power averaged over a period of time, wherein the full-scale sound mask signal power is a maximum signal power of the sound mask;
gathering a superposition of a reduced-scale sound mask signal power and the ambient noise power averaged over a period of time, wherein the reduced-scale sound mask signal power is a signal power of the sound mask reduced from the maximum signal power of the sound mask by application of a sound mask level scale factor;
estimating a sound mask signal power from the superposition of the full-scale sound mask signal power and the ambient noise power and the superposition of the reduced-scale sound mask signal power and the ambient noise power;
estimating an ambient noise power from the superposition of the full-scale sound mask signal power and the ambient noise power, the superposition of the reduced-scale sound mask signal power and the ambient noise power, and the estimated sound mask signal power;
calculating a power ratio between the superposition of the full-scale sound mask signal power and the ambient noise power and the estimated ambient noise power;
determining whether the power ratio is in a hysteresis range;
if the sound mask is not in the hysteresis range, adjusting current sound mask power level and iteration update rate; and
if the sound mask is in the hysteresis range, maintaining the current sound mask power level and iteration update rate.

19. The system of claim 18 wherein the noise accumulator and monitoring logic further comprises instructions for initializing a main loop counter ahead of gathering and averaging new signals.

20. The system of claim 18 wherein the noise accumulator and monitor further comprises instructions for configuring parameters including a full-scale sound mask signal period, a reduced-scale sound mask signal period, an adaptive step size for iteration rate adjustment, a full-scale sound mask signal period minimum, a reduced-scale sound mask signal period minimum, the sound mask level scale factor, a power ratio threshold upper limit, a power ratio threshold lower limit, a sound mask maximum level limit, and a sound mask minimum level limit, wherein the full-scale sound mask signal period is a period during which the full-scale sound mask signal power is applied, the reduced-scale sound mask signal period is a period during which the reduced-scale sound mask signal power is applied, the full-scale sound mask signal period minimum is a minimum period of the full-scale sound mask signal period, and the reduced-scale sound mask signal period minimum is a minimum period of the reduced-scale sound mask signal period.

21. The system of claim 18 wherein the adjusting the current sound mask power level and iteration update rate comprises:
calculating a sound mask power adjustment;
adjusting the sound mask power by the calculated sound mask power adjustment;
limiting the sound mask power level;
calculating an update iteration rate adjustment;
adjusting an iteration update rate; and
clipping the iteration update rate to a maximum rate.

22. The system of claim 21 wherein the determining whether the power ratio is in the hysteresis range includes determining whether the power ratio is greater than a power ratio threshold upper limit, and wherein if the power ratio is greater than the power ratio threshold upper limit:
the calculating the sound mask power adjustment calculates a sound mask power decrease;
the adjusting the sound mask power decreases the sound mask power by the calculated sound mask power adjustment;
the limiting the sound mask power level sets the sound mask power to the greater of the decreased sound mask power and a sound mask minimum level limit; and
the calculating the updated iteration rate adjustment sets the iteration rate adjustment to an adaptive step size multiplied by result of subtracting the power ratio threshold from the power ratio.

23. The system of claim 21 wherein determining whether the power ratio is in the hysteresis range includes determining whether the power ratio is less than a power ratio threshold lower limit, and wherein if the power ratio is less than the power ratio threshold lower limit:
the calculating the sound mask power adjustment calculates a sound mask power increase;
the adjusting the sound mask power increases the sound mask power by the calculated sound mask power adjustment;
the limiting the sound mask power level sets the sound mask power to the lesser of the increased sound mask power and a sound mask maximum level limit; and
the calculating the updated iteration rate adjustment sets the iteration rate adjustment to an adaptive step size multiplied by result of subtracting the power ratio from the power ratio threshold.

24. The system of claim 18 wherein the noise accumulator and monitoring logic further comprises instructions for determining a unified communication (UC) call state.

25. The system of claim 24 wherein the noise accumulator and monitor further comprises instructions for determining whether to make sound mask level adjustments based on the determined UC call state.

26. The system of claim 24 wherein the UC call state is chosen from a list consisting of idle, far-end only, near-end only, and duplex.

27. A computer-readable medium for dynamic sound mask adjustment wherein the sound mask is used for obtaining an impulse response measurement that adjusts a generated sound mask dynamically based on real-time ambient noise parameters, while maintaining echo canceller calibration performance, by:
gathering a superposition of a full-scale sound mask signal power and an ambient noise power averaged over a period of time, wherein the full-scale sound mask signal power is a maximum signal power of the sound mask;
gathering a superposition of a reduced-scale sound mask signal power and the ambient noise power averaged over a period of time, wherein the reduced-scale sound mask signal power is a signal power of the sound mask reduced from the maximum signal power of the sound mask by application of a sound mask level scale factor;
estimating a sound mask signal power from the superposition of the full-scale sound mask signal power and the ambient noise power and the superposition of the reduced-scale sound mask signal power and the ambient noise power;
estimating an ambient noise power from the superposition of the full-scale sound mask signal power and the ambient noise power, the superposition of the reduced-scale sound mask signal power and the ambient noise power, and the estimated sound mask signal power;
calculating a power ratio between the superposition of the full-scale sound mask signal power and the ambient noise power and the estimated ambient noise power;
determining whether the power ratio is in a hysteresis range;
if the sound mask is not in the hysteresis range, adjusting current sound mask power level and iteration update rate which comprises:
calculating a sound mask power adjustment;
adjusting the sound mask power by the calculated sound mask power adjustment;
limiting the sound mask power level;
calculating an update iteration rate adjustment;
adjusting an iteration update rate; and
clipping the iteration update rate to a maximum rate; and
if the sound mask is in the hysteresis range, maintaining the current sound mask power level and iteration update rate.

\* \* \* \* \*